United States Patent
Zhang et al.

(10) Patent No.: US 11,718,402 B2
(45) Date of Patent: Aug. 8, 2023

(54) SYSTEMS AND METHODS FOR A THRUST-VECTOR CONTROLLED HYBRID UNMANNED AERIAL AND GROUND VEHICLE WITH IMPROVED GRASPING

(71) Applicants: Wenlong Zhang, Tempe, AZ (US); Yizhuang Garrard, Tempe, AZ (US); Shatadal Mishra, Tempe, AZ (US); Karishma Patnaik, Tempe, AZ (US); Zachary Chase, Tempe, AZ (US); Michael Ploughe, Tempe, AZ (US)

(72) Inventors: Wenlong Zhang, Tempe, AZ (US); Yizhuang Garrard, Tempe, AZ (US); Shatadal Mishra, Tempe, AZ (US); Karishma Patnaik, Tempe, AZ (US); Zachary Chase, Tempe, AZ (US); Michael Ploughe, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 245 days.

(21) Appl. No.: 17/335,968

(22) Filed: Jun. 1, 2021

(65) Prior Publication Data
US 2021/0371101 A1 Dec. 2, 2021

Related U.S. Application Data

(60) Provisional application No. 63/033,461, filed on Jun. 2, 2020.

(51) Int. Cl.
*B64C 9/08* (2006.01)
*B64C 37/00* (2006.01)
*B64C 39/02* (2023.01)
*B64C 13/16* (2006.01)
*B64U 10/13* (2023.01)

(52) U.S. Cl.
CPC .............. *B64C 39/024* (2013.01); *B64C 9/08* (2013.01); *B64C 13/16* (2013.01); *B64C 37/00* (2013.01); *B64U 10/13* (2023.01)

(58) Field of Classification Search
CPC ........... B64C 37/00; B64C 9/08; B64C 25/06; B64C 29/0066; B64C 15/00; B64C 15/02; B64C 27/20; B60F 5/02
See application file for complete search history.

(56) References Cited

PUBLICATIONS

P. Hintjens, ZeroMQ: messaging for many applications. "O'Reilly Media, Inc.", 2013.
A. Kalantari and M. Spenko, "Design and experimental validation of hytaq, a hybrid terrestrial and aerial quadrotor," in International Conference on Robotics and Automation. IEEE, 2013, pp. 4445-4450.
C. J. Pratt and K. K. Leang, "Dynamic underactuated flying-walking (duck) robot," in International Conference on Robotics and Automation. IEEE, 2016, pp. 3267-3274.
C. Kohlhoff, "Boost. asio," Online: http://www. boost. org/doc/libs/ 1, vol. 48, No. 0, pp. 2003-2013, 2013.
(Continued)

*Primary Examiner* — Christopher P Ellis
*Assistant Examiner* — Terri L Filosi
(74) *Attorney, Agent, or Firm* — Polsinelli PC

(57) ABSTRACT

Various embodiments of a system and associated method for a thrust-vector controlled unmanned aerial and ground vehicle are disclosed herein.

20 Claims, 21 Drawing Sheets

(56) References Cited

PUBLICATIONS

C. Paucar, L. Morales, K. Pinto, M. Sanchez, R. Rodriguez, M. Gutierrez, and L. Palacios, "Use of drones for surveillance and reconnaissance of military areas," in International Conference of Research Applied to Defense and Security. Springer, 2018, pp. 119-132.

G. Heredia, A. Jimenez-Cano, I. Sanchez, D. Llorente, V. Vega, J. Braga, J. Acosta, and A. Ollero, "Control of a multirotor outdoor aerial manipulator," in International Conference on Intelligent Robots and Systems. IEEE, 2014, pp. 3417-3422.

H. Wang, J. Shi, J. Wang, H. Wang, Y. Feng, and Y. You, "Design and modeling of a novel transformable land/air robot," International Journal of Aerospace Engineering, vol. 2019, 2019.

J. Ai, J.-F. Chen, J. M. Rotter, and J. Y. Ooi, "Assessment of rolling resistance models in discrete element simulations," Powder Technology, vol. 206, No. 3, pp. 269-282, 2011.

J. Jorge, M. Vallbé, and J. A. Soler, "Detection of irrigation inhomo-geneities in an olive grove using the ndre vegetation index obtained from uav images," European Journal of Remote Sensing, vol. 52, No. 1, pp. 169-177, 2019.

J. K. Stolaroff, C. Samaras, E. R. ONeill, A. Lubers, A. S. Mitchell, and D. Ceperley, "Energy use and life cycle greenhouse gas emissions of drones for commercial package delivery," Nature communications, vol. 9, No. 1, p. 409, 2018.

J. R. Page and P. E. Pounds, "The quadroller: Modeling of a uav/ugv hybrid quadrotor," in International Conference on Intelligent Robots and Systems. IEEE, 2014, pp. 4834-4841.

K. Kondak, F. Huber, M. Schwarzbach, M. Laiacker, D. Sommer, M. Bejar, and A. Ollero, "Aerial manipulation robot composed of an autonomous helicopter and a 7 degrees of freedom industrial manipulator," in International conference on robotics and automation. IEEE, 2014, pp. 2107-2112.

K. Mullens, A. Burmeister, M. Wills, T. Nelson, and T. Denewiler, "Development of a ugv-mounted automated refueling system for vtol uavs," Space and naval warfare systems center San Diego, CA, Tech. Rep., 2006.

K. Tadakuma, C. J. Salaan, E. Takane, Y. Okada, K. Ohno, and S. Tadokoro, "Design of aerial manipulator suitable for a uav with two passive rotating hemispherical shells," in International Symposium on Safety, Security, and Rescue Robotics. IEEE, 2018, pp. 1-6.

L. de Oliveira Silva, R. A. de Mello Bandeira, and V. B. G. Campos, "Proposal to planning facility location using uav and geographic information systems in a post-disaster scenario," International Journal of Disaster Risk Reduction, p. 101080, 2019.

L. Meier, P. Tanskanen, F. Fraundorfer, and M. Pollefeys, "Pixhawk: A system for autonomous flight using onboard computer vision," in International Conference on Robotics and Automation. IEEE, 2011, pp. 2992-2997.

P. E. Pounds and A. M. Dollar, "Towards grasping with a helicopter platform: Landing accuracy and other challenges," in Australasian conference on robotics and automation, Australian Robotics and Automation Association. Citeseer, 2010.

S. Kim, S. Choi, and H. J. Kim, "Aerial manipulation using a quadrotor with a two dof robotic arm," in International Conference on Intelligent Robots and Systems. IEEE, 2013, pp. 4990-4995.

S. Mishra, D. Yang, C. Thalman, P. Polygerinos, and W. Zhang, "Design and control of a hexacopter with soft grasper for autonomous object detection and grasping," in Dynamic Systems and Control Conference. ASME, 2018.

S. Mishra, D. Yang, C. Thalman, P. Polygerinos, and W. Zhang, "Design and control of a hexacopter with soft grasper for autonomous object detection and grasping," in Dynamic Systems and Control Conference. ASME, 2018. S.-J. Kim, D.-Y. Lee, G.-P. Jung, and K.-J. Cho, "An origami-inspired, self-locking robotic arm that can be folded flat," Science Robotics, vol. 3, No. 16, p. eaar2915, 2018.

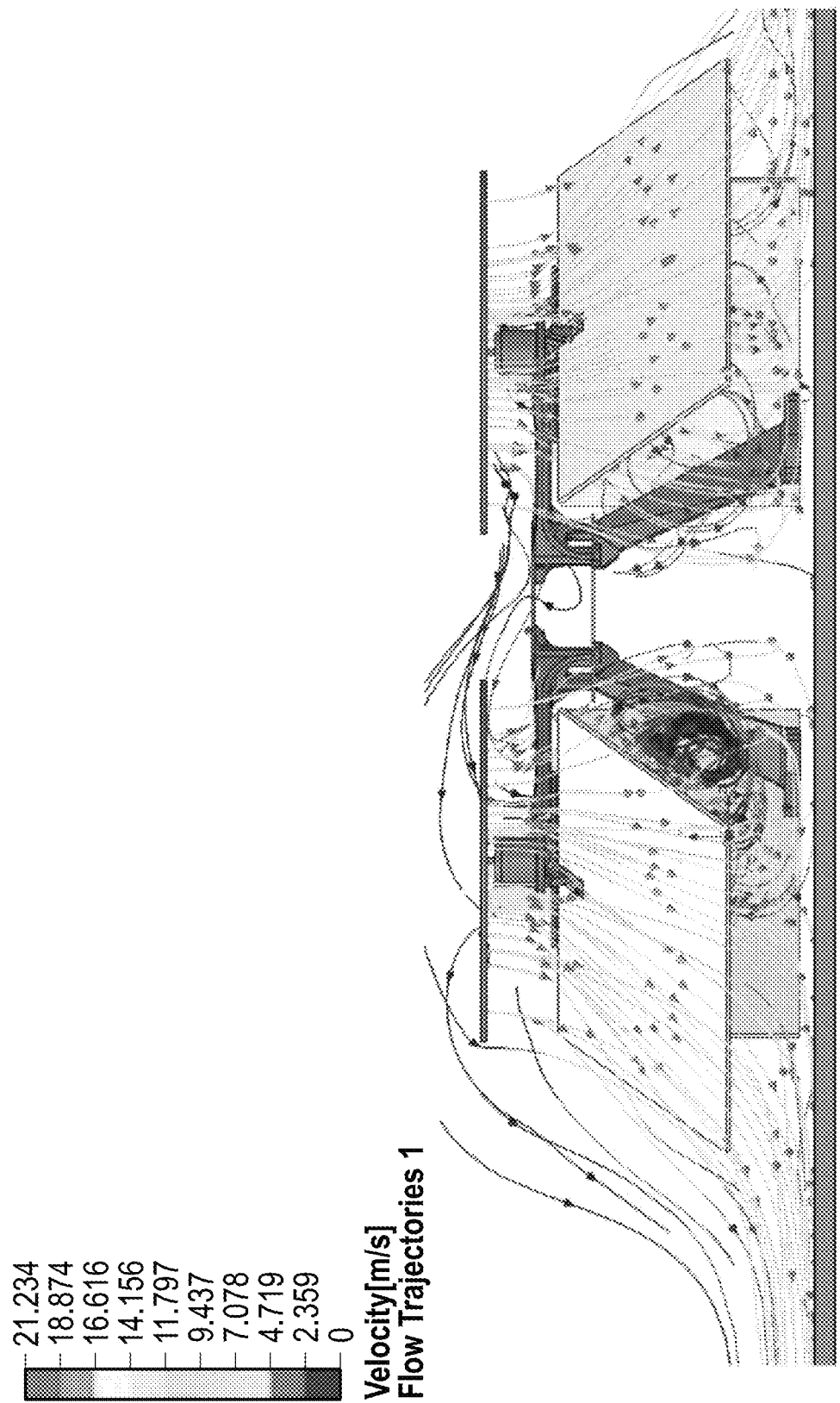

SYSTEMS AND METHODS FOR A THRUST-VECTOR CONTROLLED HYBRID UNMANNED AERIAL AND GROUND VEHICLE WITH IMPROVED GRASPING

CROSS-REFERENCE TO RELATED APPLICATIONS

This is a non-provisional application that claims benefit to U.S. Provisional Patent Application Ser. No. 63/033,461 filed 2 Jun. 2020, which is herein incorporated by reference in its entirety.

FIELD

The present disclosure generally relates to unmanned aerial and ground vehicles (UAGVs), and in particular, to improved control and maneuverability for UAGVs using thrust-vector control.

BACKGROUND

Multicopters are becoming popular for various tasks such as pick-and-place and contaminant collection. In a variety of these tasks, interactions with the environment or humans are an inevitable aspect of the task. To enable aerial grasping/manipulation, multicopters are equipped with rigid or soft graspers. However, aerial grasping/manipulation is a challenging task as it requires extremely precise real-time position control which is almost impossible due to ground effect. Especially in outdoor environments, extremely precise motion sensors are not available. For example, GPS sensors are predominantly utilized outdoors for position estimation. Although these sensors are cheap and are a good source of localization in the world frame, they are not accurate enough to perform critical tasks like aerial grasping and manipulation.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 9A-9C are a series of graphical representations showing airflow being directed by the plurality of propellers around the plurality of deflectors, each deflector being strategically angled to direct airflow around the vehicle of FIG. 1;

Corresponding reference characters indicate corresponding elements among the view of the drawings. The headings used in the figures do not limit the scope of the claims.

DETAILED DESCRIPTION

Figure 1:
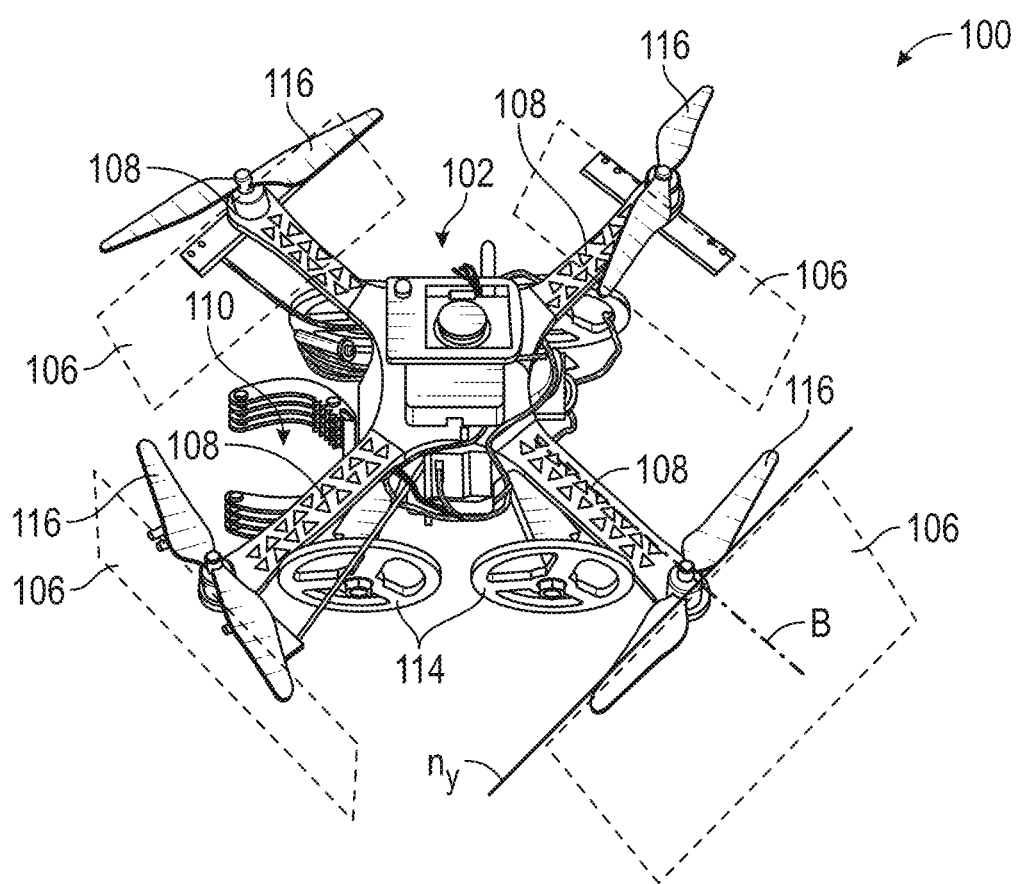
FIG. 1 is a photograph showing a thrust vector-controlled unmanned aerial and ground vehicle having a plurality of deflectors, a plurality of propellers, and a grasper.
Figure 2:
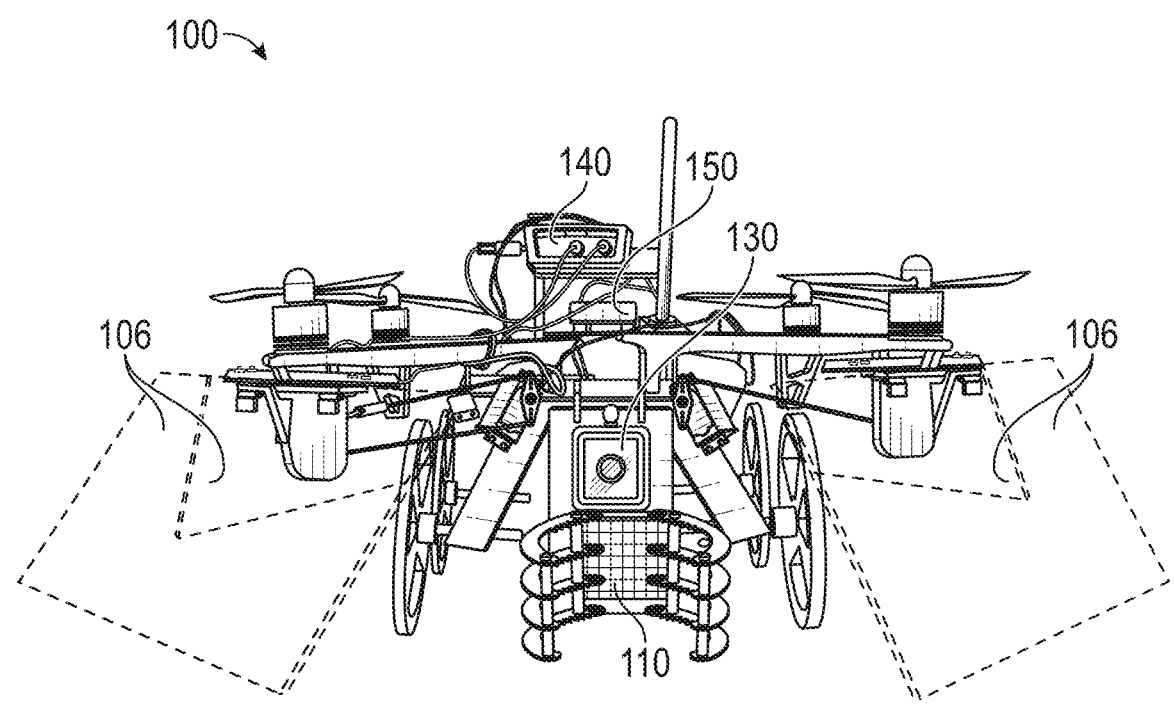
FIG. 2 is a photograph showing a side view of the vehicle of FIG. 1 illustrating locations of various electronic components.
Figure 3:
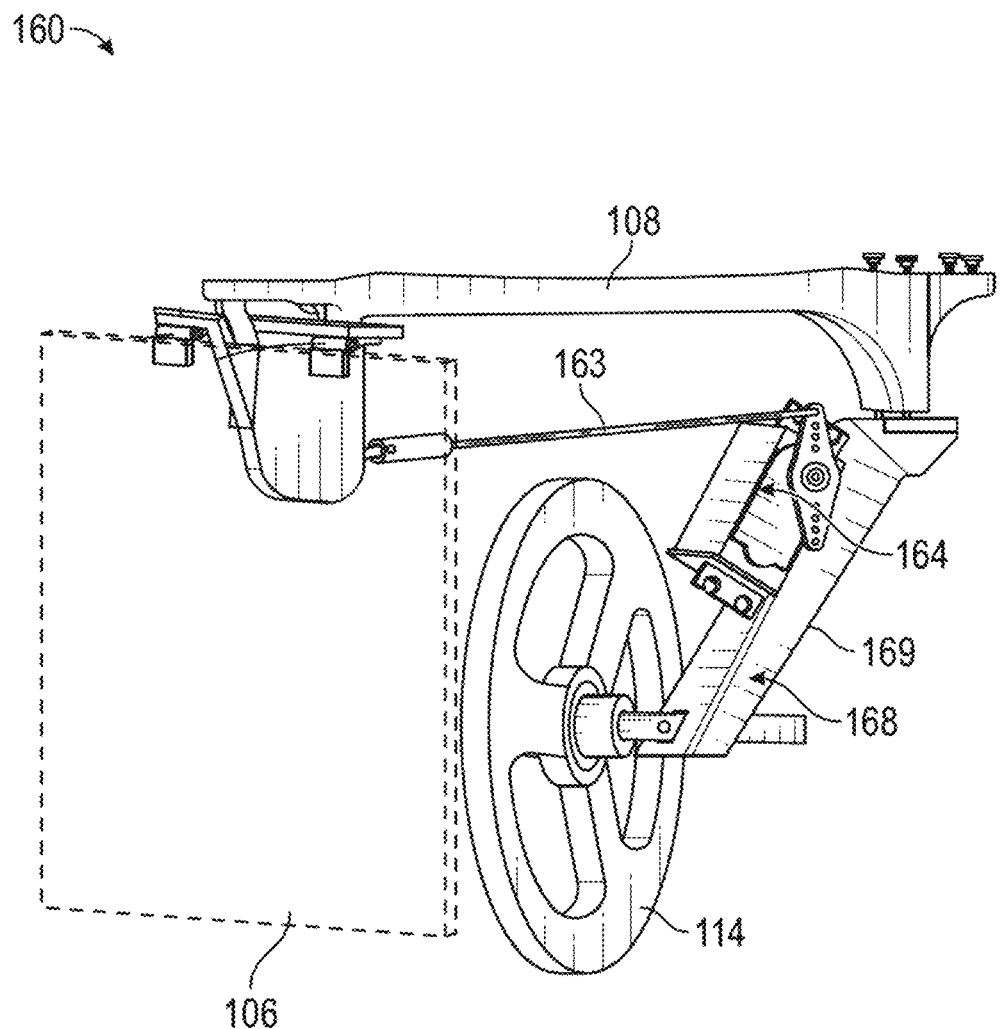
FIG. 3 is an illustration showing actuation hardware for the vehicle of FIG. 1.

Various embodiments of a thrust vector-controlled unmanned aerial and ground (UAG) vehicle, herein referred to as "the vehicle" are disclosed herein. In some embodiments, the vehicle defines a body and a plurality of arms extending from a center of the body. Each of the plurality of arms includes a respective rotatable propeller and a deflector located underneath the propeller. Each deflector is operable for controlled upward or downward rotation relative to a direction of elongation of the arm (i.e. raised or lowered, respectively) to redirect airflow underneath and around the vehicle as the propeller rotates. In one aspect, each deflector may be individually raised or lowered such that airflow can be precisely controlled for improved maneuverability of the vehicle through air. In some embodiments, the vehicle includes a forward-facing grasper and a plurality of passive wheels integrated with the body for maneuvering on a ground surface. In one aspect, the vehicle can land in front of an object and drive in a horizontal direction along the ground using the propellers and the deflectors to pick the object up using the forward-facing grasper. The vehicle further communicates with a controller module that uses sensor feedback to determine vehicle control parameters including those that control the deflectors. Referring to the drawings, embodiments of a thrust vector-controlled UAG vehicle are illustrated and generally indicated as 100 in FIGS. 1-13.

Referring directly to FIGS. 1-5C, the thrust vector-controlled unmanned aerial and ground vehicle (UAGV) or "the vehicle" 100 is shown defining a body 102 and a plurality of arms 108. The plurality of arms 108 extend radially from the body 102 of the vehicle 100. Each of the plurality of arms 108 includes a propeller 116 and an associated deflector 106, the deflector 106 being a planar surface. Each propeller 116 is rotatable by an associated propeller motor 122, either individually or collectively. Each deflector 106 is pivotable about a deflector pivot axis $n_y$ by an actuator assembly 160. The deflectors 106 allow for improved steering and control of the vehicle 100 by performing thrust-vectoring with airflow generated by the propeller 116. In some embodiments, the vehicle 100 further includes a plurality of wheels 114 located on the first and opposite second sides of the body 102. In some embodiments, the wheels 114 are passively rotatable for landing on the ground. The vehicle 100 further includes a grasper 110 located on the body 102 for grabbing or otherwise manipulating objects. The present vehicle 100 can operate in an "airborne mode" or a "ground mode" and is thus not constrained to performing precise landings on an object but can land away from the object and attempt grasping while moving on a ground surface in a "ground mode". In addition to the on-surface mobility, this vehicle 100 can also be investigated for improved aerial agility. The vehicle 100 communicates with a controller 104 for control of various electronic components of the vehicle 100 and for determining vehicle control parameters based on sensor feedback. In some embodiments, the controller 104 is located onboard the vehicle 100.

Figure 4A:
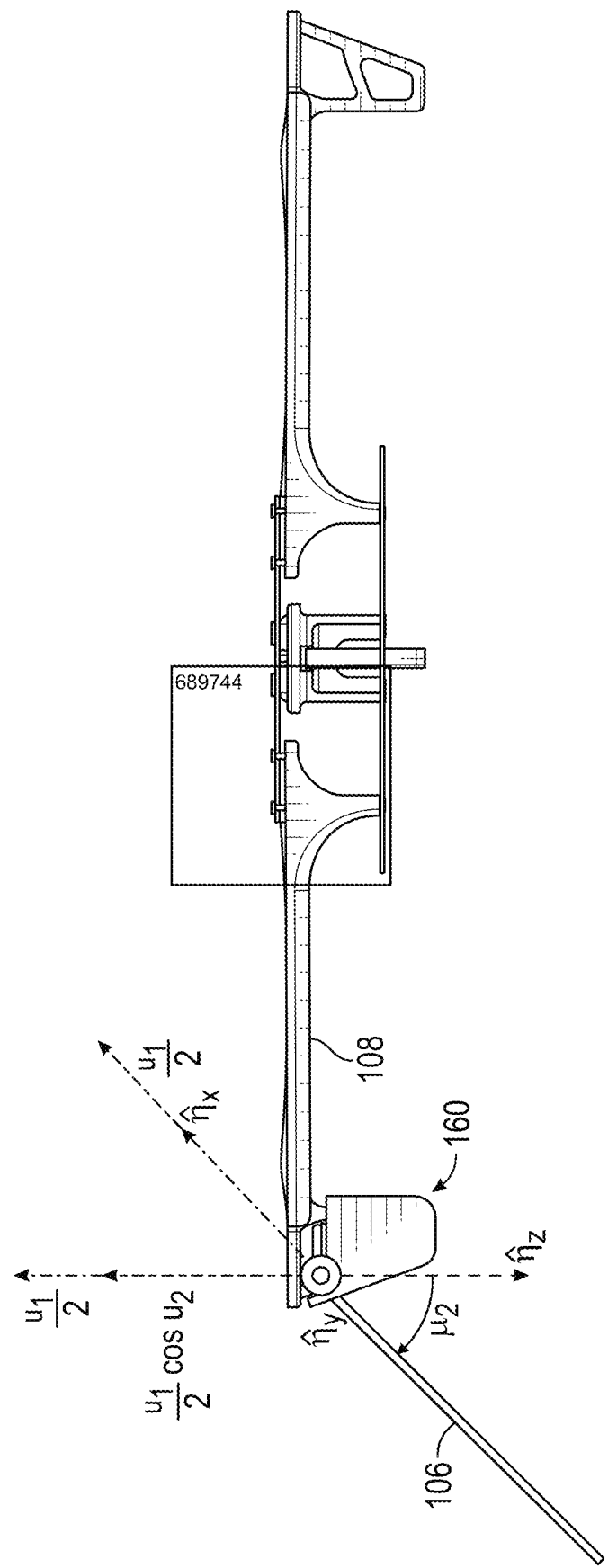
FIG. 4A is an illustration showing net upward force on the body of the vehicle of FIG. 1 produced by a single propeller.
Figure 4B:
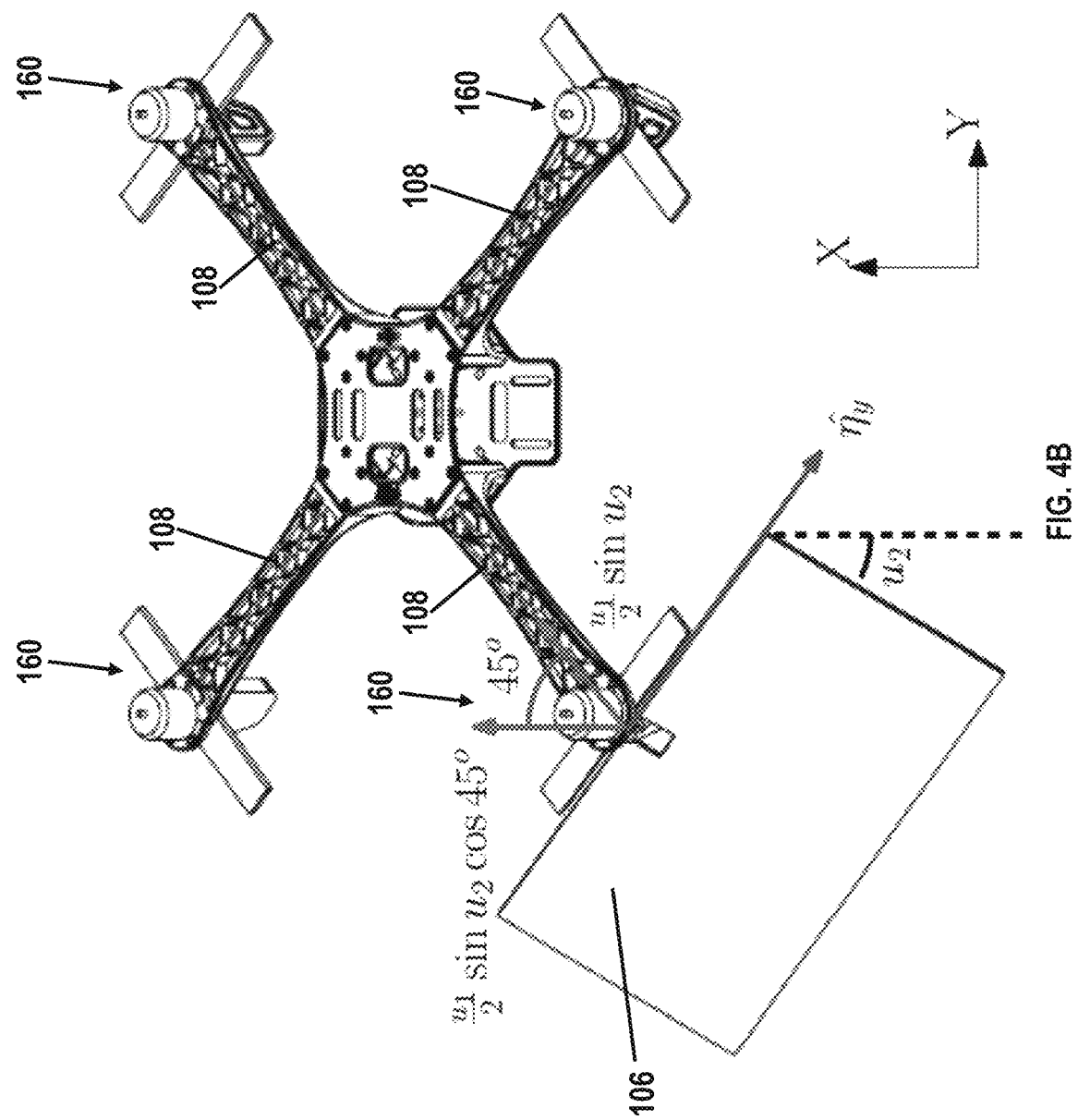
FIG. 4B is an illustration showing net vertical force on the body of the vehicle of FIG. 1 produced by a single propeller.

As further illustrated, each propeller 116 generates airflow which is re-directed by a respective deflector 106 of the plurality of deflectors 106. Each deflector 106 is pivotable about its respective deflector pivot axis $n_y$. The deflector pivot axis $n_y$ is perpendicular to the direction of elongation of the respective arm 108 (FIG. 1). In some embodiments, the pivoting of each deflector 106 is individually controlled by a respective actuator assembly 160. These actuators 164 can operate in response to input from the controller 104. In some embodiments, the actuators 164 can be connected to the deflectors 106 using push rods 163. Each push rod 163 is coupled to the actuator 164 and the deflector 106 such that as the actuator 164 rotates in a first direction, the push rod 163 increases an angle of the deflector 106 relative to the vertical axis and as the actuator 164 rotates in an opposite second direction, the push rod 163 decreases an angle of the deflector 106 relative to the vertical axis. As shown in FIGS. 4A and 4B, a deflector angle $u_2$ is increased or decreased to divert the vertical airflow from the propellers 116. In particular, the vertical thrust generated by the propellers 116 is deflected to produce horizontal thrust for enabling translational motion on the ground.

The vehicle 100 produces horizontal thrust via thrust vectoring, and for cases where its heading is aligned with the object 10 on a flat surface after it lands, the vehicle 100 uses the propellers 116, actuated deflectors 106 and the wheels 110 associated with each arm 108 to move the vehicle 100 on the ground. The air from the propellers 116 is directed along the deflectors 106 and as the air leaves the deflector 106 a force is generated on the rigid body in the opposite direction based on Newton's third law. This is exploited to achieve on-surface mobility of the vehicle 100. In some embodiments, the deflectors 106 are laser-cut acrylic plates mounted directly below the propeller motors 122 and orthogonal to the frame arms 108. The deflectors 106 can rotate about an axis below the propeller motors 122 to generate horizontal forces of different magnitudes. The deflectors 106 are 29 cm wide and 15 cm tall to maximize the captured airflow, and therefore maximize the force they generate.

Referring to FIGS. 4A-5C, the controller 104 uses sensor feedback to determine an ideal deflector angle $u_2$ and an ideal propeller speed $\sigma$ for the vehicle 100 when in ground mode. In some embodiments, the sensor is a camera 130 and can determine a position x of a target object 10 relative to the vehicle 100. The controller 104 includes a trajectory planning module 200 that applies a nonlinear predictive control model to the sensor feedback to determine the ideal deflector angle $u_2$ and an ideal propeller speed $\sigma$ for the vehicle 100. The trajectory planning module 200 can further include a system model sub-module 216, a set of input constraints 214, and a positional error sub-module 212 which are all incorporated into a nonlinear model predictive control (NMPC) sub-module 202. The trajectory planning module 200 iteratively determines an ideal deflector angle $u_2$ and an ideal propeller speed $\sigma$ either individually or collectively for each deflector 106 and propeller 116 as the vehicle approaches the object. The ideal propeller speed $\sigma$ as determined at NMPC sub-module 202 of trajectory planning block 200 is converted to a thrust value $u_1$ which is used along with the deflector angle $u_2$ as input to control the vehicle 100. Positional feedback is then sent back from the vehicle 100 and incorporated into the controller 104 in an iterative fashion for adaptable control of the vehicle 100. The propeller motors 122 operate in response to the controller 104 to rotate the propellers 116 at an appropriate rotational speed.

Figure 6:
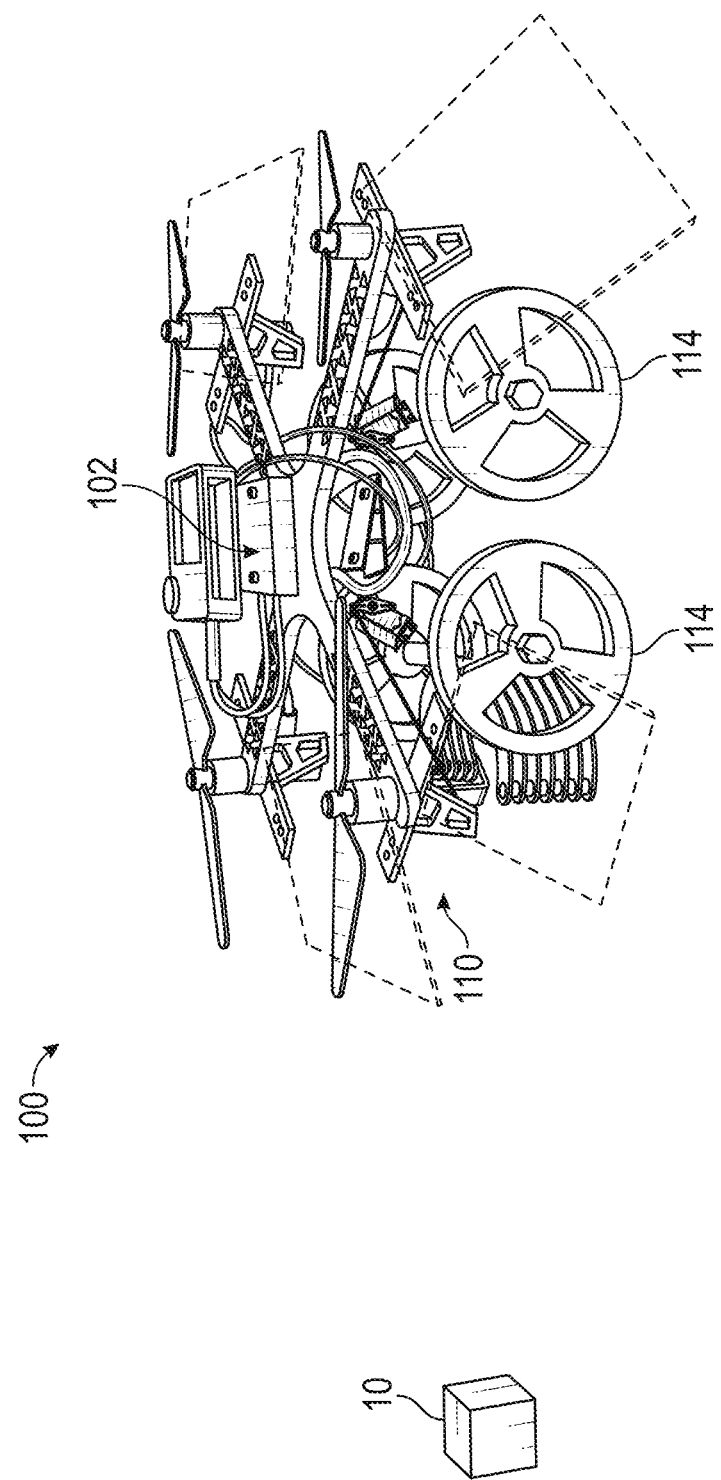
FIG. 6 is a photograph showing the vehicle of FIG. 1 traveling on the ground and approaching an object.
Figure 7A:
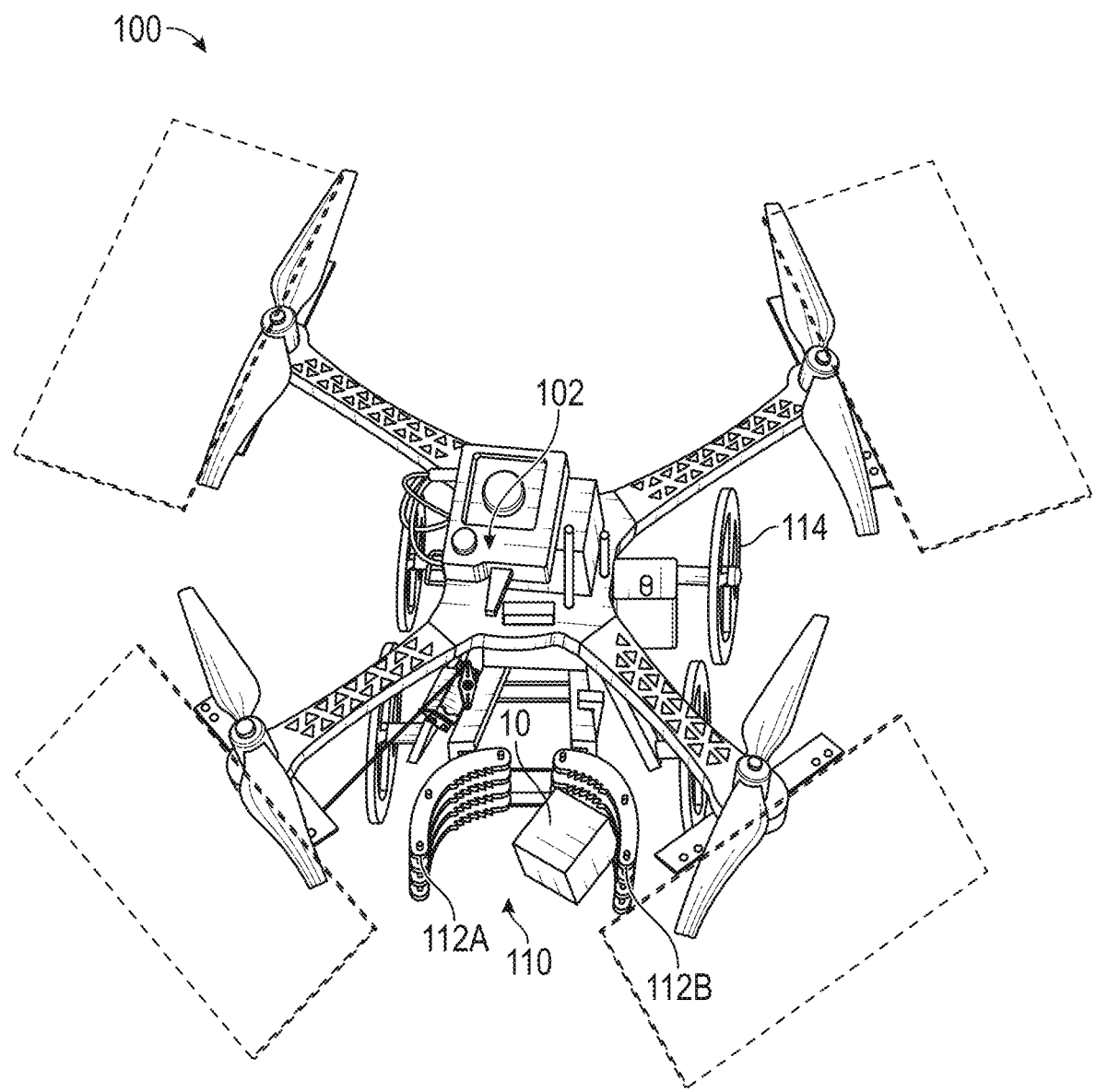
FIGS. 7A and 7B are sequential photographs of the vehicle of FIG. 1 respectively showing the grasper surrounding and gripping an object.
Figure 7B:
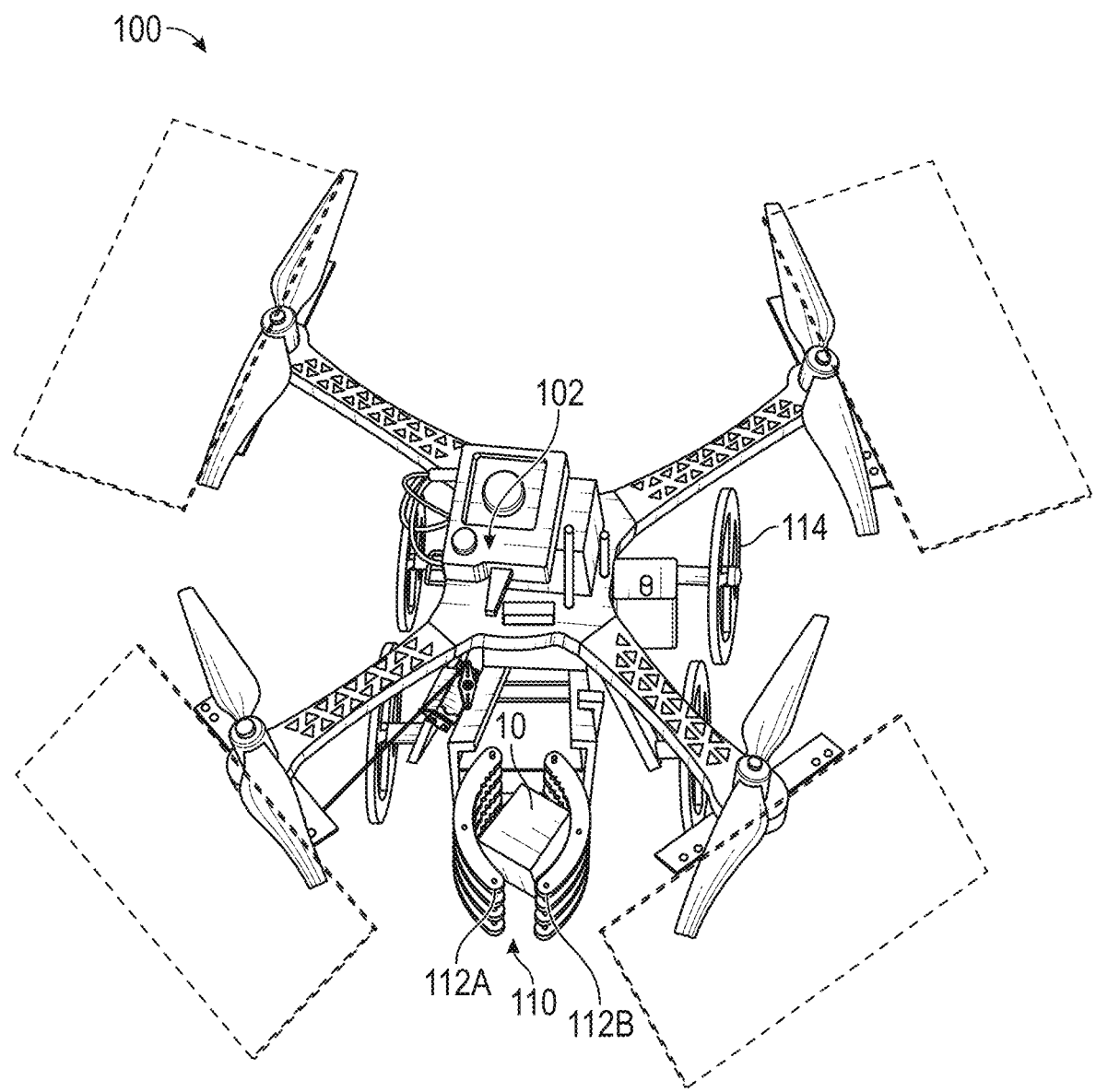

Referring to FIGS. 3 and 6-7B, the vehicle 100 can travel on the ground to approach objects 10 in addition to traveling through air. To facilitate a transition between air and land, the vehicle 100 is equipped with landing gear 168 including a plurality of passive wheels 114. In addition, the vehicle 100 further includes the grasper 110 located on the front side of the body 102. In some embodiments, as shown in FIGS. 7A and 7B, the grasper 110 includes a first claw 112A and a second claw 112B. In FIG. 7A, the vehicle 100 is shown approaching an object 10 and in FIG. 7B the vehicle 100 is shown grasping the object 10 by bringing the first and second claws 112A and 112B together. In some embodiments, grasper 110 is operated by grasper motor 124. It should be noted that in an alternate embodiment of the vehicle 100, the grasper 110 may be a different type of tool such as a shovel or a probe. In some embodiments, the wheels 114 are embodied as continuous track wheels for improved maneuverability on certain types of surfaces. In some embodiments, the vehicle 100 can include floats (not shown) in lieu of wheels 114 for object collection on water. In addition, a plurality of sensors can be included onboard the vehicle 100 such as additional cameras, Geiger counters, non-destructive testing (NDT) tools, etc.

Landing gear 168 aboard the vehicle 100 includes four unpowered, 3D printed legs 169 each associated with a respective wheel 114 so that the vehicle 100 can be restricted to forward or backward motion while on the ground. The deflector actuators 164 are fixed onto the landing gear 168 and are attached to the deflectors 106 with push rods so that the deflectors can move between 0° and 45° outwards. The actuation assembly 160 can be seen for a single arm 108 of the plurality of arms 108 in FIG. 3.

The vehicle includes a camera 130 to detect objects and a standard robotic aluminum grasper 110 to collect objects that the camera 130 detects. In some embodiments, the grasper 110 is fixed below the body 102 of the vehicle 100 and is front-facing. The camera 130 is also front-facing and mounted above the grasper 110 such that the distance between the grasper 110 and camera 130 is minimized. The camera 130 is connected to the high-level computer 140 that processes images from the camera 130 and generates control setpoints for the vehicle 100. The grasper 110 is actuated by a grasper motor 124 onboard the vehicle 100 that receives input from the controller 104 to operate the grasper 110.

System Modelling and Derivation

In the aerial mode, the vehicle 100 uses conventional quadrotor control techniques to fly. However, after landing, a ground mode model is implemented by trajectory planning model 200 on the controller 104 for control of the vehicle while on a ground surface. This section describes the ground mode model developed using first principles for the actuator assembly 160 and deflectors 106 and also presents the validation through Solid-Works Flow Simulation. The notations frequently used in this disclosure are described in Table. I.

TABLE I

NOTATIONS

| | |
|---|---|
| $\{X, Y, Z\}$ | the body fixed frame with origin at CG of vehicle |
| $\{\hat{\eta}_x, \hat{\eta}_y, \hat{\eta}_z\}$ | co-ordinate system for each deflector, with its origin at the midpoint of the deflector's top edge |
| $M \in \mathbb{R}$ | mass of UAGV |
| $u_1 \in \mathbb{R}$ | thrust produced by each rotor |
| $u_2 \in [0, 45°]$ | angle made by the deflector with |
| $\sigma \in \mathbb{R}$ | rotor PWM |
| $F_{def} \in \mathbb{R}$ | force on deflector |
| $F_{h_x} \in \mathbb{R}$ | component of $F_{def}$ in body X-Y plane |
| $F_u \in \mathbb{R}$ | total upward force during ground locomotion in Z axis |
| $F_h \in \mathbb{R}$ | total forward force during ground locomotion in X axis |

A. Camera Setup

As shown in FIGS. 2 and 5A-5C, a front-facing monocular camera 130 is utilized for object detection and tracking. Color and edge detection techniques are implemented by an object detection and tracking module 220 utilized for the purpose of object detection and tracking. Once the object is detected by the camera 130, the contour area ($A_c$) in the camera frame is calculated from different distances ranging from 0.25 m to 1.5 m. In some embodiments of the vehicle 100, the camera 130 loses features and the tracking performance deteriorates when the object is within 0.25 m. As a result, the calculated depth (d) is inaccurate. This problem can be resolved by using a tilting camera instead of a fixed camera so that the object is always in the frame. After data logging, MATLAB's curve fitting tool is utilized to obtain a function between contour area and depth. The equations representing the model between contour area and depth is as follows:

$$d = \begin{cases} 2.021e^{(-0.0021A_c)} + 0.07472e^{(0.0031A_c)}, & A_c < 500 \\ 0.9576e^{(-0.001674A_c)} + 0.6411e^{(0.0001057A_c)}, & A_c \geq 500 \end{cases}$$

Figure 11:
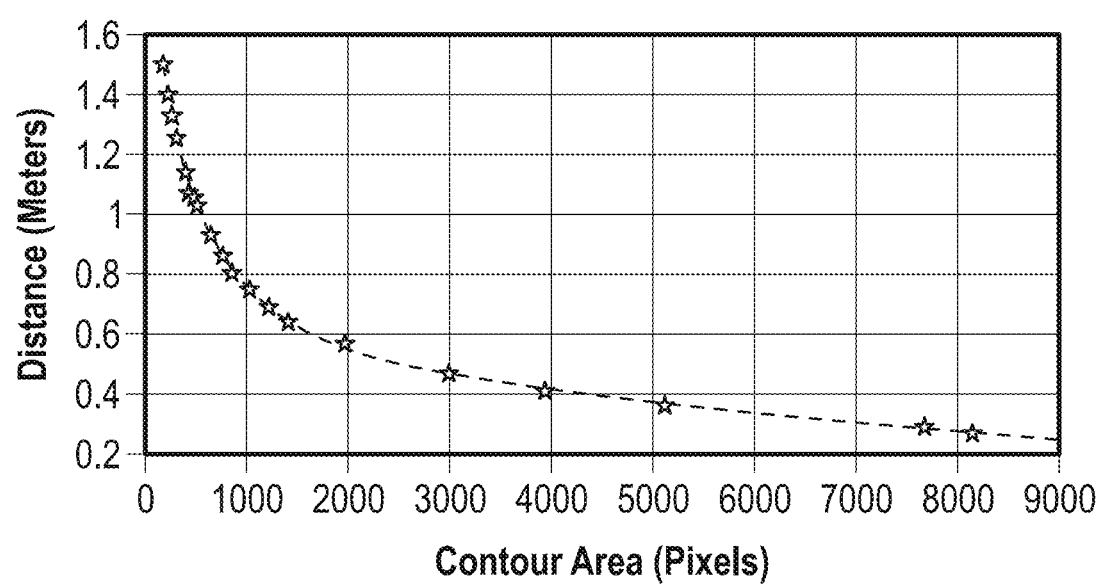
FIG. 11 is a graphical representation showing a relation between contour area and distance for the camera.

FIG. 11 shows the relation between the contour area and the depth at which the tracked object is located.

B. Vehicle Feedback Control Setup

Figure 5A:
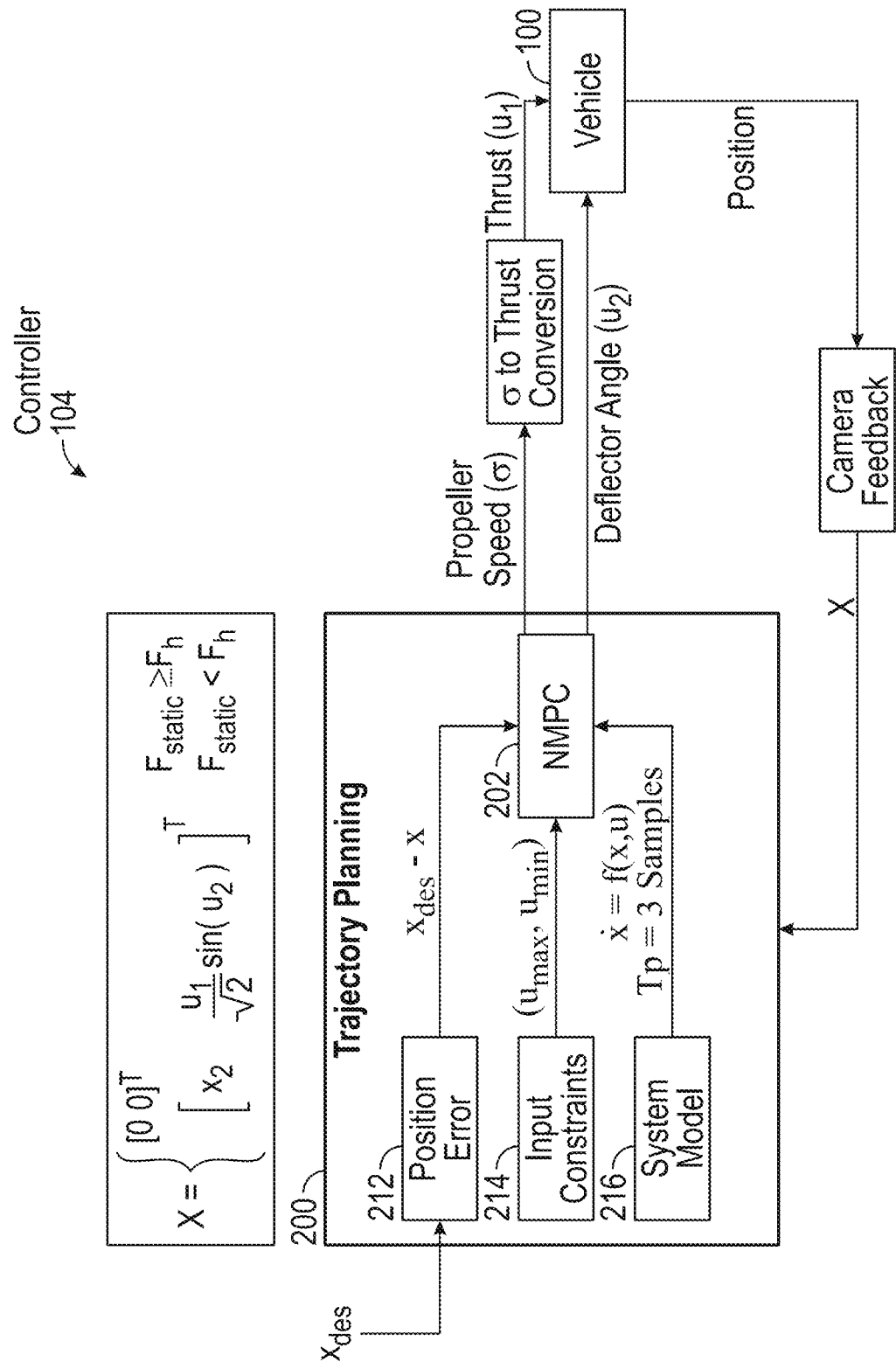
FIGS. 5A-5C are a series of block diagrams showing a controller for the vehicle of FIG. 1 and associated electronic components.
Figure 5B:
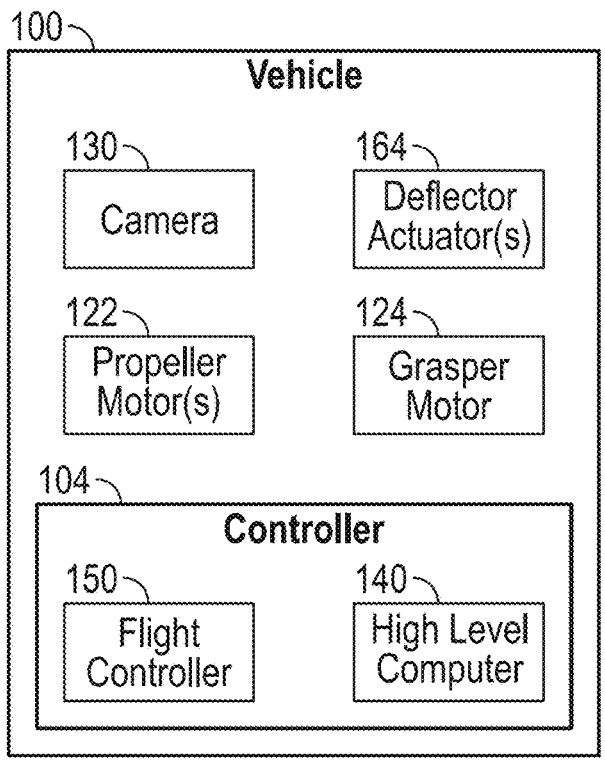
Figure 5C:
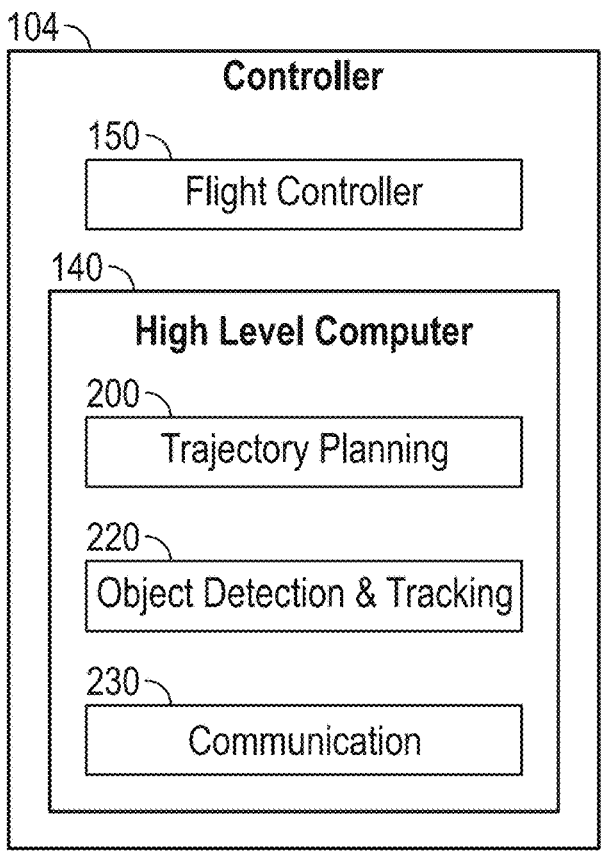
Figure 10A:
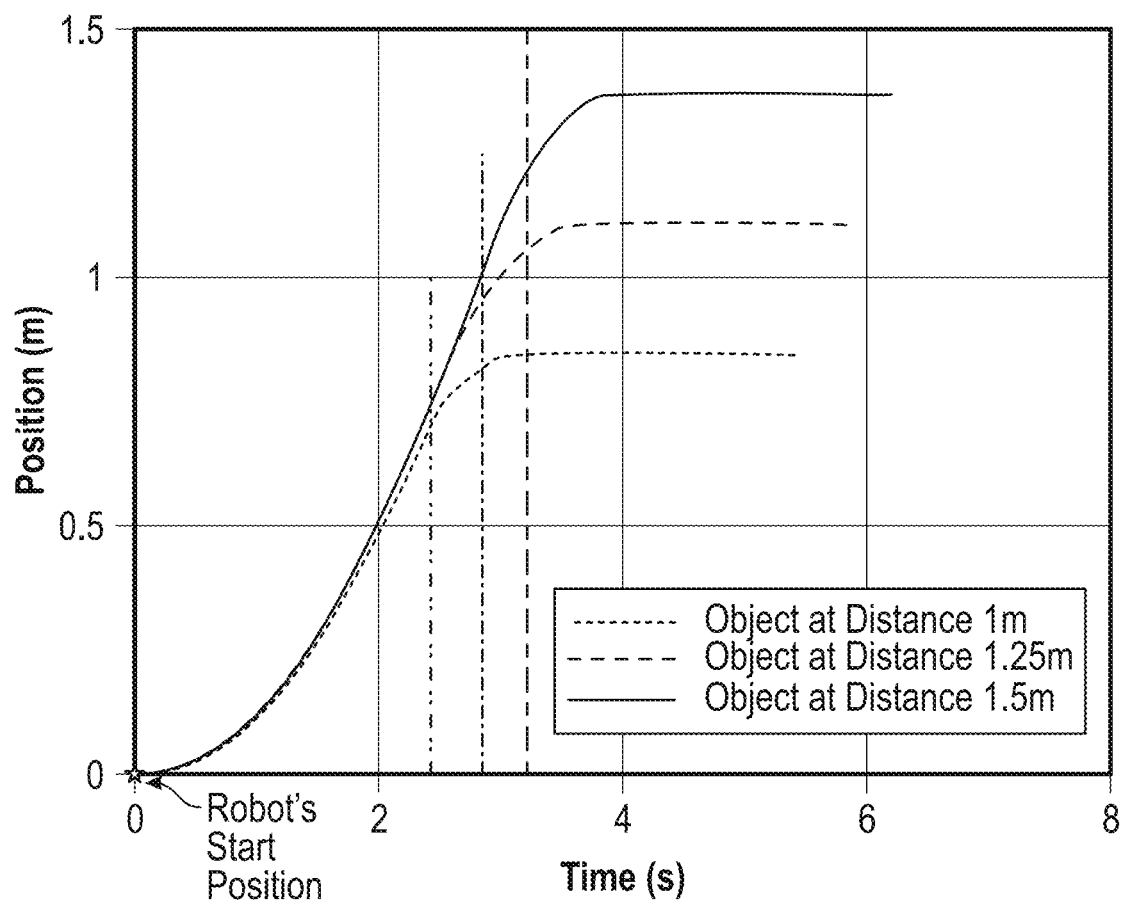
FIG. 10A-10D are a series of graphical representations showing state trajectories with NMPC and control signals with respect to error.
Figure 10B:
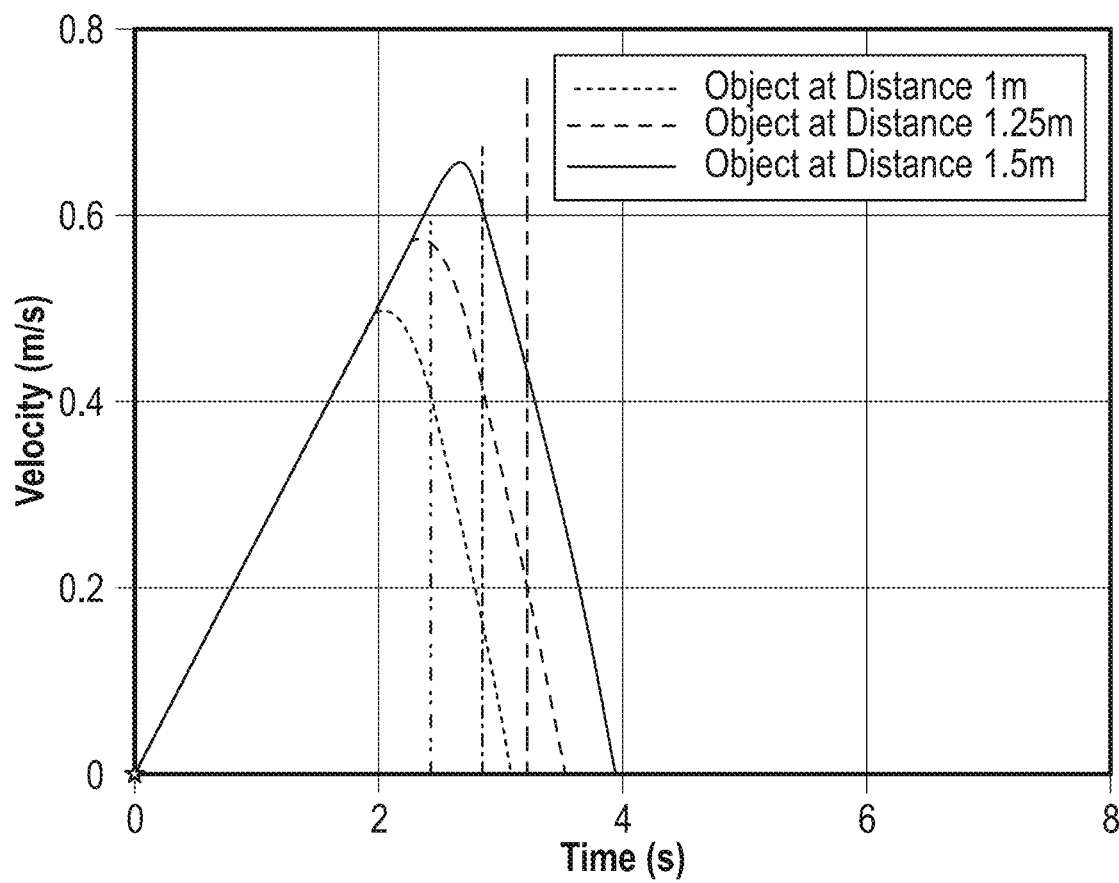
Figure 10C:
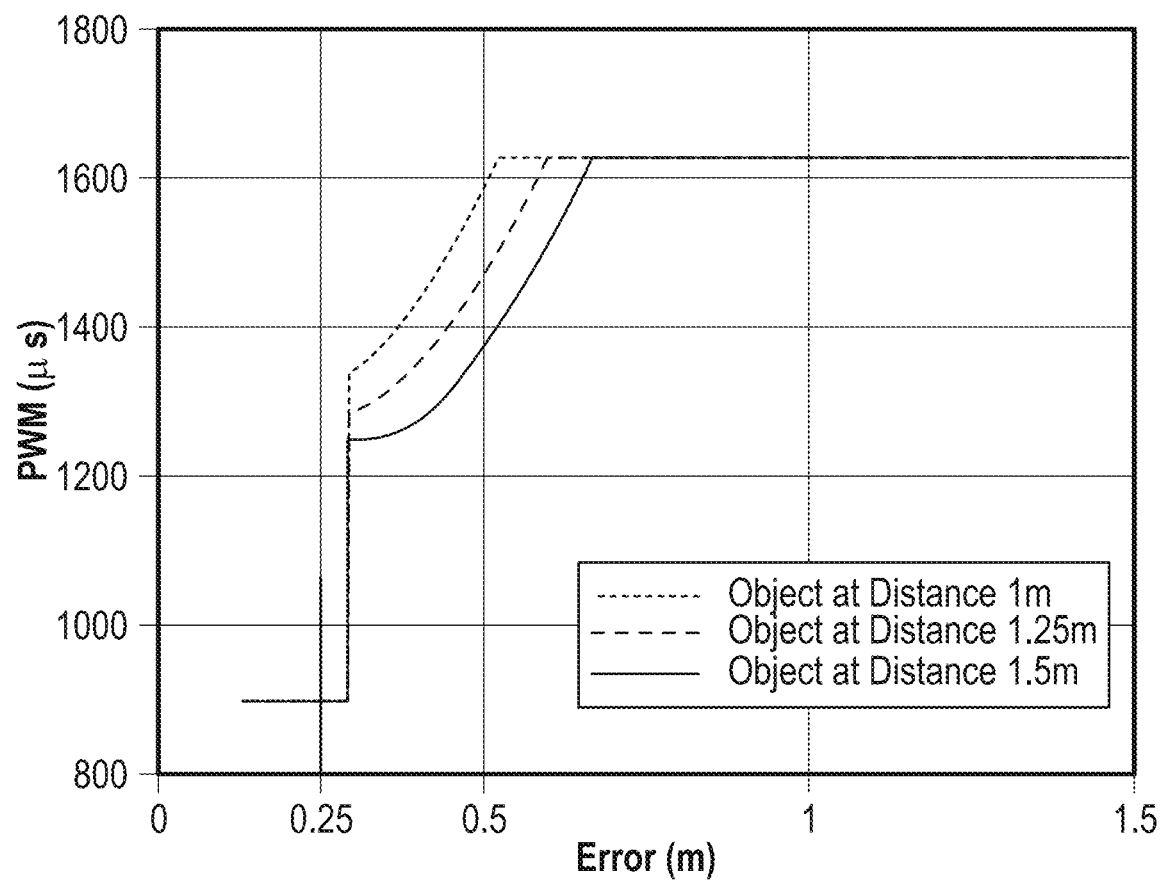
Figure 10D:
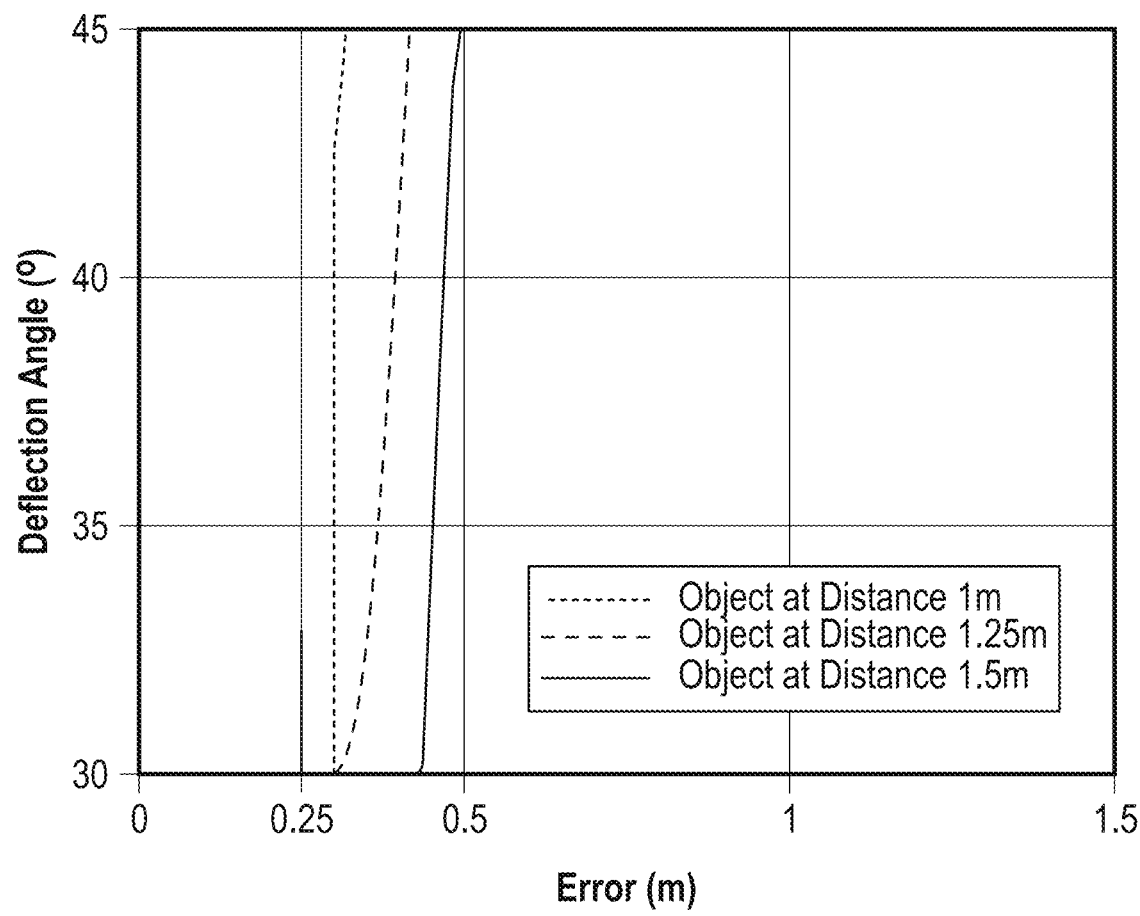

As shown in FIGS. 5A-5C, the trajectory planning module 200 can be implemented on a high-level computer 140. The computed signals from the trajectory planning module 200 are transmitted serially to a flight control unit 150. In some embodiments, the vehicle 100 uses a 1 MP global shutter forward facing camera 130 in communication with an object detection and tracking module 220 for object detection and tracking. The camera 130 is connected over USB 2.0 to the high-level computer 140, however it should be noted that alternative connection protocols can be used including wireless connection (i.e. Bluetooth, Wi-Fi, etc) or a wired connection (i.e. USB-C, micro-USB, etc.). One embodiment of the camera 130 outputs 640×480 images at 80 frames per second (FPS). The trajectory planning module 200, as well as the object detection and tracking module 220 and a low-level communication module 230 were implemented on the high-level computer 140. In some embodiments, the high-level trajectory planning module 200 runs at an update rate of 50 Hz. The low-level communication framework was developed using ZeroMQ and Boost ASIO libraries. The high-level computer 140 communicates over serial protocol with the flight control unit 150. The control signals are implemented as shown in FIGS. 10C and 10D.

C. Ground Mode Modelling

Figure 8:
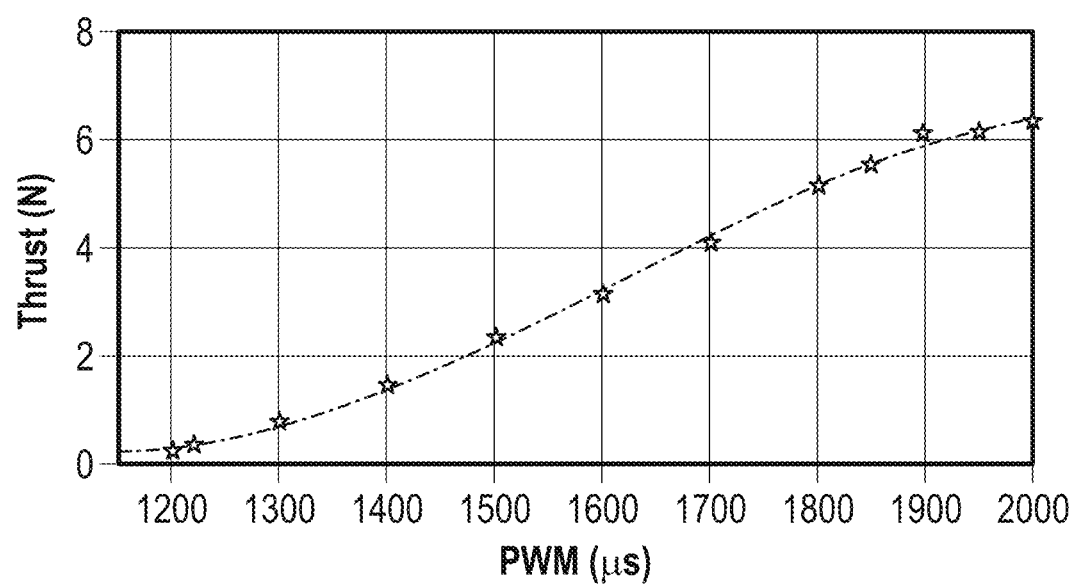
FIG. 8 is a graphical representation showing pulse width modulation (PWM) with respect to thrust of the vehicle of FIG. 1 following experimental testing.

For the ground mode model, propeller speed (pulse width modulation PWM) ($\sigma$) and deflector angle ($u_2$) are inputs to the trajectory planning module 200. To find the total thrust, ($u_1$), generated by each propeller 112 for a particular embodiment of vehicle 100, a custom rig was used to mount the propeller motor 122 and propeller 116 facing into a balancing scale and experimentally find the relationship between $\sigma$ and $u_1$. The MATLAB curve fitting toolbox was used to obtain this relationship as given in Eq. (1) and FIG. 8 shows the corresponding plot.

$$u_1 = -\left(\frac{\sigma - 1618}{290}\right)^3 - 0{,}01249\left(\frac{\sigma - 1618}{290}\right)^2 + 2.885\left(\frac{\sigma - 1618}{290}\right) + 3.413 \quad (1)$$

Next, the component of $u_1$ is found along the deflector, $F_{def}$, and finally its component in the body X direction, $F_h$, to determine the total available forward thrust for ground motion. Let $\hat{\eta}_x$ denote an axis parallel to the surface of the deflector 106 at any instant and $\hat{\eta}_y$ denote the axis about which the deflector 106 rotates as shown in FIGS. 4A and 4B. From the figure, it is shown that the axis of rotation of each respective deflector 106, $\hat{\eta}_y$, is an axis obtained by rotating the body's Y axis 45° in a clockwise direction in the X-Y plane. The control input $u_2$ is defined as the angle made by the deflector 106 measured from the $\hat{\eta}_z$-axis as shown in FIG. 4A. Since the deflector 106 is mounted below the center of the associated propeller 116, it captures only half of the total downward airflow and redirects it along $\hat{\eta}_x$. Assuming that during this process, there is no separation of air flow and air loss, Newton's third law can be applied to calculate the amount of force generated on the vehicle 100 due to this diverted air flow as shown in FIG. 4A as $$F_{def} = \frac{u_1}{2} \quad (2)$$

This force can further be decomposed into components along the body's Z-direction and the X-Y plane as shown in FIGS. 4A and 4B respectively as $$F_{h_x} = F_{def} \sin u_2 \quad (3)$$

Therefore, the 45° cosine component of $F_h$ gives us the net forward thrust due to a single propeller 116.

During ground mode, the loss of forward force due to mixing air from the front two propellers 116 is minimized by simply turning them off and also setting the front deflectors 106 at a fixed angle to prevent collisions with the ground. Therefore, the total upward and horizontal forces on the vehicle 100 due to the rear two propellers 116 using Eqs. (2) and (3) are:

$$F_u = 2\left(\frac{u_1}{2} + \frac{u_1}{2}\cos u_2\right) \quad (4)$$

$$F_h = 2\left(\frac{u_1}{2}\sin u_2 \cos 45°\right) = \frac{u_1}{\sqrt{2}}\sin u_2 \quad (5)$$

where $F_h$ is in the body X direction. $F_u$ does not contribute to the forward motion but influences the static friction by decreasing the net reaction force.

Assuming that the rolling coefficient $\mu_r$ is constant during the motion, the frictional force on the vehicle 100 is given by:

$$F_{fric} = -\mu_r(Mg - F_u) \quad (6)$$

where M=2.4616 kg and g=9.81 m/s² denotes the mass of the vehicle 100 and the acceleration due to gravity, respectively. The value of rolling friction for the surface and for one embodiment of the vehicle 100 is experimentally determined. The vehicle 100 is first placed on a flat surface and the angle of inclination is manually increased. From this experiment, the coefficient of rolling friction, $\mu_r$, is given by $\mu_r = \tan\beta$ where $\beta$ is the angle at which the vehicle 100 starts rolling. From the experiments, the value of $\mu_r$ for the vehicle 100 on a carpet is $\tan 3° = 0.0524$, however this value can vary between embodiments of the vehicle 100.

The vehicle 100 needs to overcome static friction before it starts rolling and the static friction for the current system is a function of $u_1$ and $u_2$ according to the equation:

$$F_{static} = -\mu_s\left(Mg - 2\left(\frac{u_1}{2} + \frac{u_1}{2}\cos u_2\right)\right) \quad (7)$$

where $\mu_s$ is the coefficient of static friction. As the rolling friction coefficient is less than the static friction coefficient, the model based controller should also account for static friction. This is important to design an optimal control law for the system with two inputs and it is possible that for a particular $\sigma$ value, there may not exist a feasible $u_2$, which will produce a horizontal force, $F_h$, greater than the static friction force and consequently the vehicle 100 will fail to move forward. To model the static friction coefficient, initial $u_2$ is set to 45° and $\sigma$ to $1000\mu_s$ and $\sigma$ is incremented by $50\mu_s$ to identify the $\sigma$ value at which the vehicle begins to roll. Once the $\sigma$ value is identified, $F_h = F_{static}$ and $\mu_s$ is determined to be 0.0557 from Eq. (6).

Therefore, the system dynamics of the vehicle 100 in ground mode can be expressed as:

$$\dot{x} = \begin{cases} [0\ 0]^T & F_{static} \geq F_h \\ [x_2(1/m)(F_h - F_{fric})]^T & F_{static} < F_h \end{cases} \quad (8)$$

where $x = [x_1\ x_2]^T$ represents the state of the vehicle 100 such that $x_1, x_2$ denote the position and velocity in the body X-axis, respectively. The dynamics of the vehicle 100 are therefore nonlinear with input coupling.

B. SolidWorks Validation

Figure 9A:
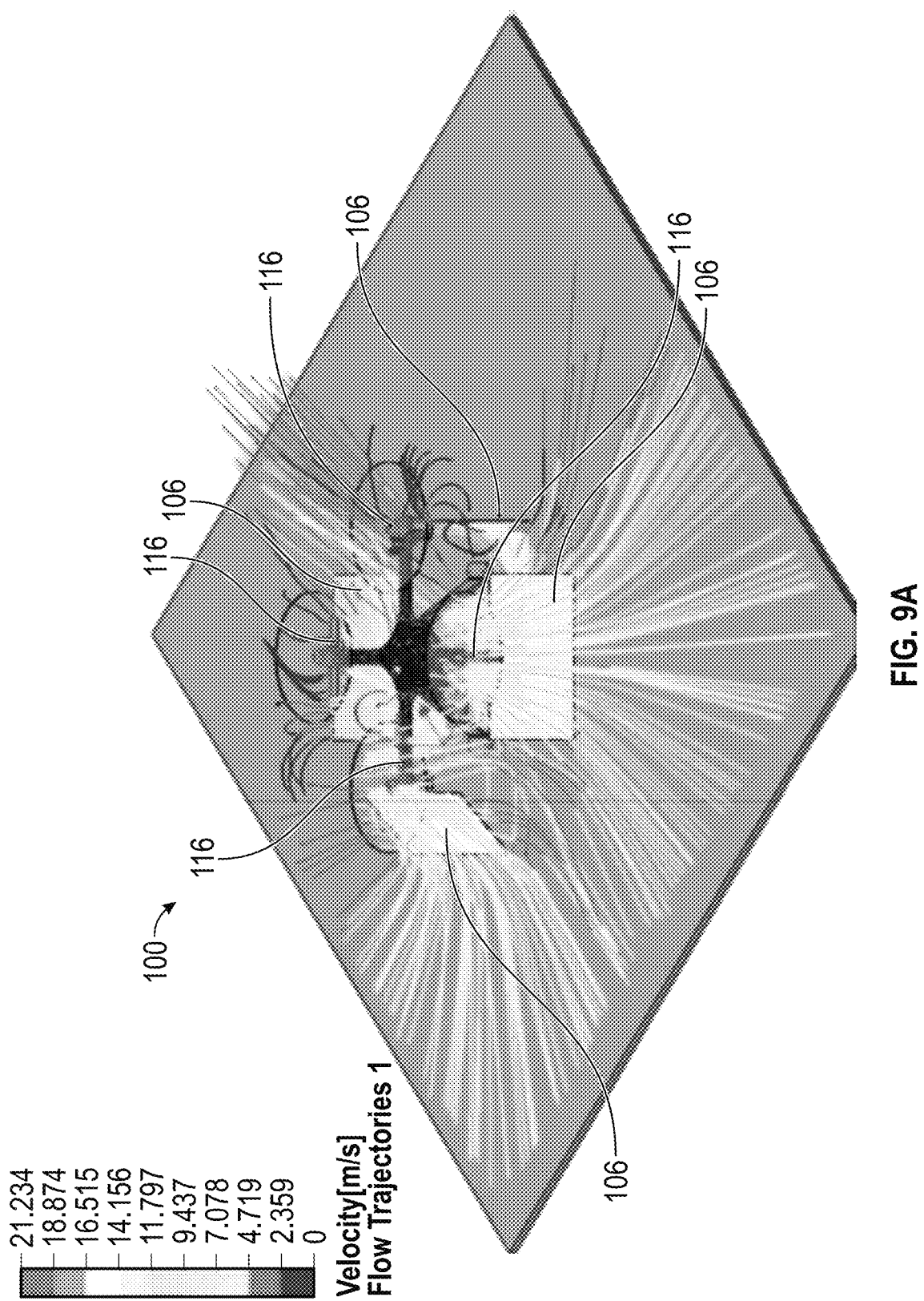
Figure 9B:
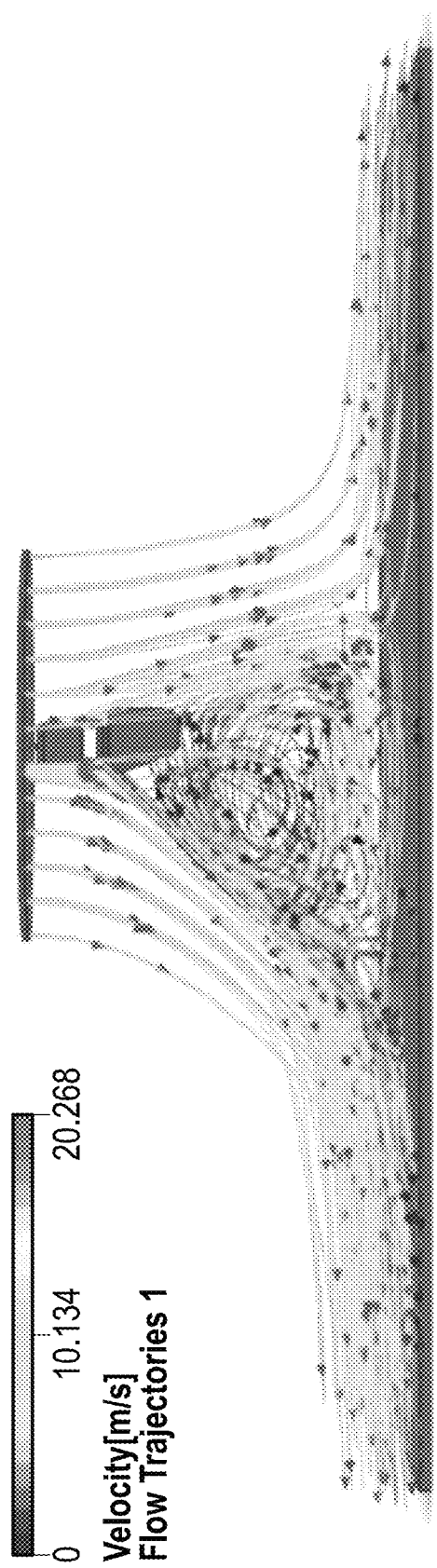

Referring to FIGS. 9A-9C, this section first studies the force generated by one deflector 106 in case (a) and then proceed to validate the net forward force produced by two deflectors 106 in case (b). In both cases, the deflector angles, $u_2$, are set to 45°. To simplify the 3D model and reduce computation time, features that do not significantly contribute to the required analysis are first removed. Then, a standard default global mesh is run in the SolidWorks setup. The propeller 112 is modeled as a cylinder since only the outlet velocity of the air leaving the propeller 112 is relevant for the analysis. The arm and wheels on the bottom of the legs are also removed from the simulations as they provide negligible variations of the flow field and reduce the computational time significantly. The angle between the deflector 106 and vertical axis is 45°. Through experimental testing of the thrust force taken from a single propeller 112, the outputs ranged from 0N to 6N. Using dynamic pressure theory Vis computed:

$$\text{Thrust} = C_p\ (V^2 - V_0^2)A \quad (9)$$

where $V_0 = 0$ ms$^{-1}$, $A = \pi D^2/4$, $D = 0.22860$ m, and $C = 0.5$ is the lift co-efficient. Velocity at the top inlet of the propeller 112 is set to 0 ms$^{-1}$ due to stagnant air conditions. The resulting output for the velocity exiting the bottom outlet of the propeller 112 is the unknown variable V. This theory, which is derived from the Bernoulli equation, can be used to determine the relationship between the force output from the propeller 112 and the velocity output of the air flow. Choosing a value of 2N for the simulations, the determined air velocity beneath the propeller 112 equates to 9 ms$^{-1}$ for a 9-inch diameter propeller 112 at standard atmospheric conditions with initial stagnant air velocity of 0 ms$^{-1}$. The resultant air velocities below the propellers 112 are used in cases (a) and (b) to find the force produced by the deflectors 106.

In case (a), the outward face of the deflector 106 is selected for force calculations and run a surface force parameter integration on SolidWorks to obtain the resultant forces and their components acting upon that face. With this procedure, a total force of 1.052N along $\hat{\eta}_x$ was determined on the deflector 106 with the $F_{h_x}$ component force of 0.742N. These results show that under the assumptions of no air separation or air loss, the horizontal force produced by the deflector 106 follows Eq. (3). FIG. 9B shows the side view of the SolidWorks simulation for the single propeller case.

For case (b), the outward faces of the deflectors are selected to determine the total force which will propel the vehicle 100 forward on the ground. Running the same surface parameter integration as in case (a), a net force acting upon the deflectors of 2.189N is computed with the $F_{h_x}$ being 1.598N. This supports the formulation for the horizontal force developed in Eq. (3). FIG. 9C shows the front view of the simulation for two deflectors.

Position Control in Ground Mode

Referring to FIGS. 5A-5C, this section describes the guidance and control in ground mode as implemented by controller 104, and in particular, as implemented by trajectory planning module 200. The trajectory planning module 200 achieves precise grasping using a variant of explicit nonlinear model predictive control (NMPC) as shown in FIG. 5A. From Eq. (8), it is shown that the system has nonlinear dynamics with input coupling and therefore, the vehicle 100 includes or otherwise communicates with the NMPC-based trajectory planning module 200 to find optimal control trajectories for the vehicle based on position, propeller speed, and deflector angle. The cost function as implemented with NMPC sub-module 202 of the trajectory planning module 200 is formulated as:

$$\min_u \int_{t_0}^{t_0+T_p} (x(\tau) - x_{ref})^T R(x(\tau) - x_{ref}) + u^T Q u \, d\tau \quad (10)$$
$$\text{s.t.} \quad \dot{x} = f(x, u)$$
$$u_{min} \le u \le u_{max}$$

where f(x, u) is given by Eq. (8), $x_{ref}=[x_{ref} \; v_{ref}]^T$ and $u(1)=\sigma, u(2)=u_2$ denote the propeller speed and the deflector angle, respectively. The values for the control limits are set to $u_{min}=[900_{\mu s} \; 30°]^T$ and $u_{max}=[1620_{\mu s} \; 45°]^T$ where 900 μs corresponds to zero motor speed. From experiments it was shown that the back two wheels 112 of an embodiment of the vehicle 100 tend to lift off from the ground for propeller speed having PWMs greater than 1620 μs, and hence as a safety measure, the maximum propeller speed value is restricted to 1620 μs. However, it should be noted that this empirically determined value can vary between embodiments of the vehicle 100. The upper limit for the deflector angle is due to the mechanical design and the lower limit corresponds to a value below which the force generated by the deflectors 106 is negligible. The cost matrices R and Q are tuned to achieve an over damped response and are set to:

$$R = \begin{bmatrix} 150 & 0 \\ 0 & 1.25 \end{bmatrix}, Q = \begin{bmatrix} 0.001 & 0 \\ 0 & 0.001 \end{bmatrix}$$

In the experiments, camera feedback is used, but it was found that for an object within 0.25 m, camera feedback cannot be used for calculating the control input if the camera 130 is fixed. Further, since the vehicle 100 does not employ active braking and it is necessary to make sure that the vehicle 100 does not overshoot the object's location, the vehicle 100 exploits the concept of braking distance to ensure that the vehicle 100 reaches the object. The trajectory planning module 200 is designed such that with the calculated control sequence, the vehicle arrives at $(x_{obj}-0.25)$m, where $x_{obj}$ denotes the position of the object, with a predetermined velocity such that after it reaches $(x_{obj}-0.25)$m, the control is turned off and the vehicle 100 relies on friction to bring itself to a stop at $x_{obj}$.

Simulation Results

From experimental data, an initial velocity required for a particular embodiment of the vehicle 100 to come to a complete stop after 0.25 m from the current position with the propellers turned off, was determined to be 0.42 ms$^{-1}$. It should be noted that the value can vary between embodiments of the vehicle 100. The reference position and velocity for the NMPC controller are therefore set at:

$$[x_{ref} v_{ref}]^T [x_{ref} v_{ref}]^T = [(x_{obj}-0.25) 0.42]^T$$

A prediction horizon $T_p$ of the trajectory planning module 200 is set to three samples with a control update rate of 50 Hz. The control trajectory is simulated for initial distances of [0.75 1 1.25]m and interpolated for the intermediate values to ensure consistent performance with varying initial distances from the object. The interior-point method is used to solve the optimization problem of Eq. (10) and generate the optimal control sequence. The control signal generated for different initial distances is shown in FIGS. 10C and 10D. The black solid line at 0.25 m shows the distance at which the control is turned off and the σ and $u_2$ values are set to 900 μs and 30° respectively so that the vehicle 100 slows to a stop. FIGS. 10A and 10B show the state trajectories during the entire time duration. The dotted vertical lines demarcate the points in time after which the propellers 116 are turned off.

Experimental Studies

This section outlines the setup for conducting experimental trials to test aspects of the vehicle 100. Motion capture data was utilized solely for capturing the performance of the proposed structure and was not used for motion planning or control. The motion capture data was logged at 100 Hz. A polyurethane foam-based carpet was utilized as the surface to prevent sideways sliding movement.

Experiments were performed for three different initial conditions for placement of an object 10: i) object 10 is at 1 m, ii) object 10 is at 1.25 m, and iii) object 10 is at 1.5 m.

TABLE II

MEAN AND STANDARD DEVIATION OF FINAL DISTANCE BETWEEN THE OBJECT AND UAGV (15 TRIALS FOR EACH CASE)

| Initial Distance | Mean | Standard Deviation |
|---|---|---|
| 1 m | −0.0609 m | 0.0366 m |
| 1.25 m | 0.0370 m | 0.0202 m |
| 1.5 m | 0.0462 m | 0.0273 m |

Figure 12:
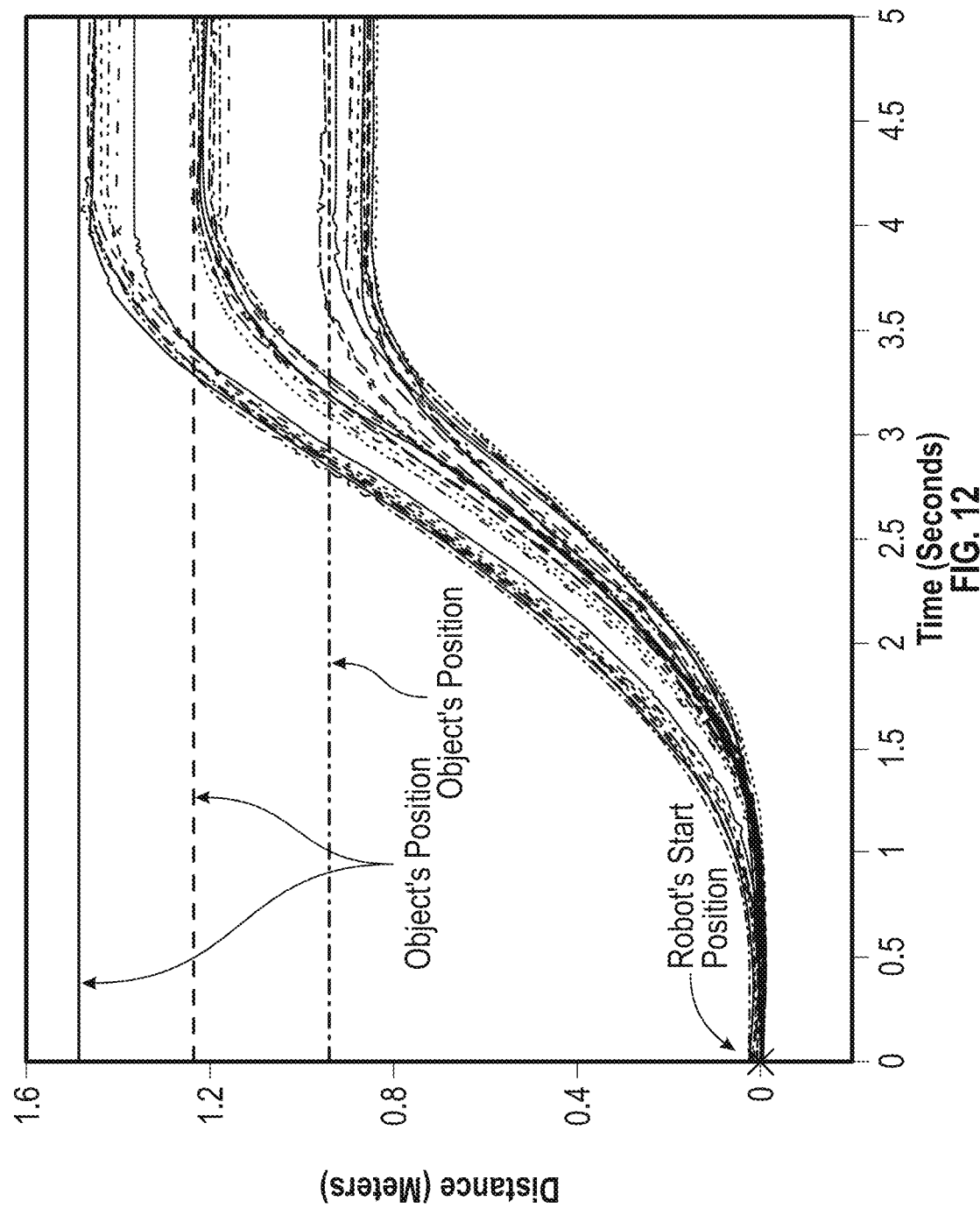
FIG. 12 is a graphical representation showing NMPC control performance for an object placed at different initial conditions for a total of 45 trials.

Each initial condition has the object 10 aligned with the heading of the vehicle 100. Fifteen trials were conducted for each initial condition to verify the performance of the control structure. FIG. 12 shows the control performance for each trial, and Table II shows the mean and standard deviation of the error between a position of the object 10 and the final position of the vehicle 100 for each initial condition. For every trial, the vehicle 100 consistently stops when the object 10 is within the grasping area. The small standard deviation for the errors indicates that the NMPC structure consistently drives the vehicle 100 to the correct distance and the object 10 is always within the reach of the grasper 110. FIGS. 6-7B show video screenshots for a grasp from the top and side views.

Computer-Implemented System

Figure 13:
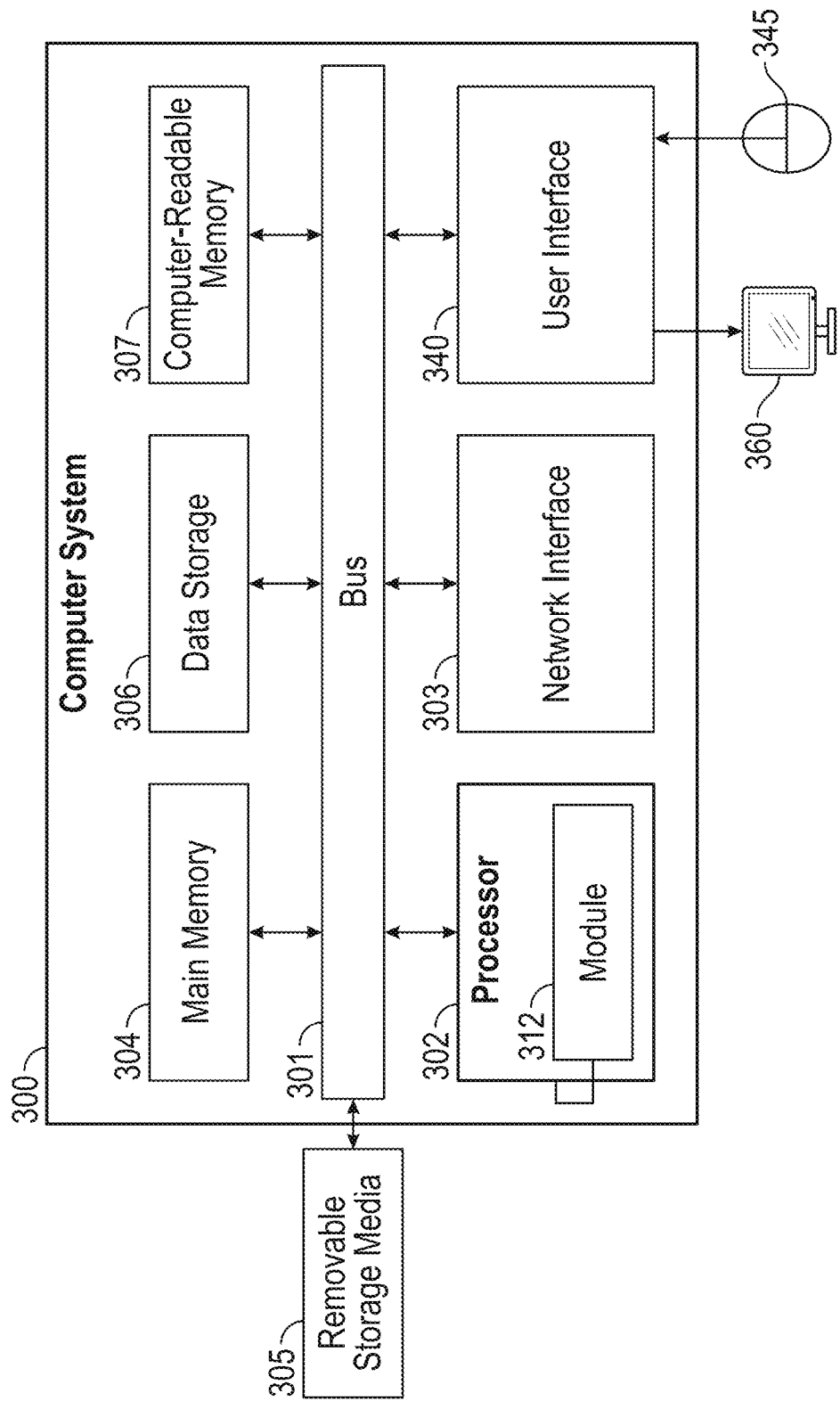
FIG. 13 is a diagram showing an example computing system for implementation of the controller of FIG. 5A-5C.

FIG. 13 illustrates an example of a suitable computing and networking environment (computer system 300) which may be used to implement various aspects of the present disclosure. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of a system application or otherwise, may include a hardware-implemented module and may accordingly configure a processor 302, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 300 may be a general purpose computing device 300, although it is contemplated that the networking environment 300 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 300 may include various hardware components, such as a processing unit 302, a main memory 304 (e.g., a memory or a system memory), and a system bus 301 that couples various system components of the general purpose computing device 300 to the processing unit 302. The system bus 301 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 300 may further include a variety of computer-readable media 307 that includes removable/non-removable media and volatile/nonvolatile media, but excludes transitory propagated signals. Computer-readable media 307 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 300. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 304 includes computer storage media in the form of volatile/nonvolatile memory such as read only memory (ROM) and random access memory (RAM). A basic input/output system (BIOS), containing the basic routines that help to transfer information between elements within the general purpose computing device 300 (e.g., during start-up) is typically stored in ROM. RAM typically contains data and/or program modules that are immediately accessible to and/or presently being operated on by processing unit 302. For example, in one embodiment, data storage 306 holds an operating system, application programs, and other program modules and program data.

Data storage 306 may also include other removable/non-removable, volatile/nonvolatile computer storage media. For example, data storage 306 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 300.

A user may enter commands and information through a user interface 340 or other input devices 345 such as a tablet, electronic digitizer, a microphone, keyboard, and/or pointing device, commonly referred to as mouse, trackball, or touch pad. Other input devices 345 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 345 are often connected to the processing unit 302 through a user interface 340 that is coupled to the system bus 301, but may be connected by other interface and bus structures, such as a parallel port, game port or a universal serial bus (USB). A monitor 360 or other type of display device is also connected to the system bus 301 via user interface 340, such as a video interface. The monitor 360 may also be integrated with a touch-screen panel or the like.

The general purpose computing device 300 may operate in a networked or cloud-computing environment using logical connections of a network Interface 303 to one or more remote devices, such as a remote computer. The remote computer may be a personal computer, a server, a router, a network PC, a peer device or other common network node, and typically includes many or all of the elements described above relative to the general purpose computing device 300. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 300 may be connected to a public and/or private network through the network interface 303. In such embodiments, a modem or other means for establishing communications over the network is connected to the system bus 301 via the network interface 303 or other appropriate mechanism. A wireless networking component including an interface and antenna may be coupled through a suitable device such as an access point or peer computer to a network. In a networked environment, program modules depicted relative to the general purpose computing device 300, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A vehicle, comprising:
   a body defining a plurality of arms extending radially from the body, wherein each arm of the plurality of arms respectively includes:
      a propeller rotatable about a vertical axis, wherein the propeller is associated with a respective propeller motor and wherein the propeller is operable for producing a propeller speed;
      a deflector pivotable about a horizontal axis and located underneath the propeller, wherein the deflector is associated with a respective actuator assembly and wherein the deflector defines a deflector angle; and
      a rotatable wheel associated with the actuator assembly, wherein the rotatable wheel is passively rotatable when in contact with a ground surface;
   wherein the propeller is further operable to generate vertical thrust and wherein the deflector is operable to deflect the vertical thrust from the propeller to produce an amount of horizontal thrust for enabling translational motion of the vehicle on the ground surface; and
   a controller in operative communication with the propeller motor and the deflector actuator assembly, wherein the controller is operable for determining an optimal propeller speed and an optimal deflector angle necessary to generate the amount of horizontal thrust needed for the vehicle to approach and capture an object based on estimated parameters of the vehicle and an estimated position of the object.

2. The vehicle of claim 1, wherein the controller determines the optimal propeller speed and the optimal deflector angle using a non-linear model predictive control model.

3. The vehicle of claim 1, wherein the estimated parameters of the vehicle include vehicle velocity and vehicle position.

4. The vehicle of claim 1, wherein the controller minimizes a cost function to determine the optimal propeller speed and the optimal deflector angle based on the estimated parameters of the vehicle, wherein the cost function is given by:

$$\min_{u} \int_{t_0}^{t_0+T_p} (x(\tau) - x_{ref})^T R(x(\tau) - x_{ref}) + u^T Q u \, d\tau$$

$$\text{s.t.} \quad \begin{aligned} x &= f(x, u) \\ u_{min} &\leq u \leq u_{max} \end{aligned}$$

where u is a vector including propeller speed and deflector angle and where x is a function descriptive of system dynamics of the vehicle in a ground mode.

5. The vehicle of claim 4, wherein the system dynamics of the vehicle in ground mode is expressed as $$x = \begin{cases} [0 \ 0]^T & F_{static} \geq F_h \\ \left[ x_2 \ \frac{u_1}{\sqrt{2}} \sin(u_2) \right]^T & F_{static} < F_h \end{cases}$$

represents a state of the vehicle, where $x_2$ is a vehicle velocity in the X-axis, where $u_1$ corresponds to a propeller speed and where $u_2$ corresponds to a deflector angle.

6. The vehicle of claim 1, further comprising a sensor, wherein the sensor provides feedback to the controller.

7. The vehicle of claim 6, wherein the sensor is a camera and wherein the feedback to the controller includes a vehicle position.

8. The vehicle of claim 7, wherein the feedback to the controller includes the estimated position of the object.

9. The vehicle of claim 1, wherein the deflector comprises a planar surface.

10. The vehicle of claim 1, wherein the horizontal axis is perpendicular to a direction of elongation of the respective arm of the plurality of arms.

11. The vehicle of claim 1, wherein the actuator assembly includes:
an actuator motor associated with a push rod, wherein the push rod is coupled to the actuator motor and the deflector such that as the actuator motor rotates in a first direction, the push rod increases an angle of the deflector relative to a vertical axis and as the actuator motor rotates in an opposite second direction, the push rod decreases an angle of the deflector relative to the vertical axis.

12. The vehicle of claim 1, wherein the vehicle includes a tool located on the front side of the body.

13. The vehicle of claim 12, wherein the tool is a grasper, and wherein the grasper is associated with a respective grasper actuator such that the grasper is operable to capture an object.

14. The vehicle of claim 1, wherein each rotatable wheel includes an associated leg such that the rotatable wheel is located underneath the body of the vehicle.

15. A method, comprising: providing a vehicle including: a propeller rotatable about a vertical axis, wherein the propeller is associated with a respective propeller motor and wherein the propeller is operable for generating a propeller speed; a deflector pivotable about a horizontal axis and located underneath the propeller, wherein the deflector is associated with a respective actuator assembly and wherein the deflector defines a deflector angle; and a sensor, wherein the sensor provides feedback to a controller including an estimated position of the vehicle and an estimated position of an object; wherein the propeller is operable to generate vertical thrust and wherein the deflector is operable to deflect the vertical thrust from the propeller to produce an amount of horizontal thrust for enabling translational motion of the vehicle on the ground surface; and providing the controller in operative communication with the respective propeller motor and the deflector actuator assembly, wherein the controller is operable to: receive the estimated position of the vehicle and the estimated position of the object; and determine an optimal propeller speed and an optimal deflector angle necessary to generate the amount of horizontal thrust needed for the vehicle to approach and capture an object based on the estimated position of the vehicle and the estimated position of the object.

16. The method of claim 15, further comprising applying the optimal propeller speed to the respective propeller motor and applying the optimal deflector angle to the respective actuator assembly.

17. The method of claim 16, further comprising:
actuating a grasper when the vehicle approaches the estimated position of the object.

18. The method of claim 15, wherein the steps of receiving the estimated position of the vehicle and estimated position of the object and determining the optimal propeller speed and the optimal deflector angle are iteratively repeated.

19. The method of claim 15, wherein the step of determining the optimal propeller speed and the optimal deflector angle includes:
minimizing a cost function to determine the optimal propeller speed and the optimal deflector angle based on the estimated parameters of the vehicle, wherein the cost function is given by:

$$\min_{u} \int_{t_0}^{t_0+T_p} (x(\tau) - x_{ref})^T R(x(\tau) - x_{ref}) + u^T Q u \, d\tau$$

$$\text{s.t.} \quad \begin{array}{l} x = f(x, u) \\ u_{min} \leq u \leq u_{max} \end{array}$$

where u is a vector including propeller speed and deflector angle and where x is a function descriptive of system dynamics of the vehicle in a ground mode.

20. The method of claim 19, wherein the system dynamics of the vehicle in ground mode is expressed as $$\dot{x} = \begin{cases} [0 \ 0]^T & F_{static} \geq F_h \\ \left[x_2 \frac{u_1}{\sqrt{2}} \sin(u_2)\right]^T & F_{static} < F_h \end{cases}$$

represents a state of the vehicle, where $x_2$ is a vehicle velocity in the X-axis, where $u_1$ corresponds to a propeller speed and where $u_2$ corresponds to a deflector angle.

* * * * *